United States Patent
Yamaoka et al.

(10) Patent No.: US 8,584,134 B2
(45) Date of Patent: Nov. 12, 2013

(54) JOB ASSIGNING APPARATUS AND JOB ASSIGNMENT METHOD

(75) Inventors: Nobuyoshi Yamaoka, Kawasaki (JP); Junichi Ishimine, Kawasaki (JP); Ikuro Nagamatsu, Kawasaki (JP); Masahiro Suzuki, Kawasaki (JP); Tadashi Katsui, Kawasaki (JP); Yuji Ohba, Kawasaki (JP); Seiichi Saito, Kawasaki (JP); Akira Ueda, Kawasaki (JP); Yasushi Uraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 12/817,410

(22) Filed: Jun. 17, 2010

(65) Prior Publication Data
US 2011/0010717 A1    Jan. 13, 2011

(30) Foreign Application Priority Data
Jul. 7, 2009 (JP) ................. 2009-161101

(51) Int. Cl.
| G06F 9/46 | (2006.01) |
| G06F 1/00 | (2006.01) |
| G06F 1/26 | (2006.01) |
| G06F 1/32 | (2006.01) |
| G06F 11/30 | (2006.01) |
| G06F 15/173 | (2006.01) |

(52) U.S. Cl.
USPC ........... 718/104; 718/100; 718/102; 709/223; 709/224; 709/226; 713/300; 713/323; 713/340

(58) Field of Classification Search
USPC .......... 718/100, 102, 104; 713/300, 310, 320, 713/340
See application file for complete search history.

(56) References Cited

U.S. PATENT DOCUMENTS

| 7,584,021 | B2* | 9/2009 | Bash et al. ............ 700/276 |
| 2003/0110012 | A1 | 6/2003 | Orenstien et al. |
| 2004/0187126 | A1* | 9/2004 | Yoshimura ............ 718/100 |
| 2004/0215987 | A1* | 10/2004 | Farkas et al. .......... 713/300 |
| 2005/0050373 | A1* | 3/2005 | Orenstien et al. ........ 713/320 |
| 2005/0055590 | A1 | 3/2005 | Farkas et al. |
| 2005/0278520 | A1 | 12/2005 | Hirai et al. |

(Continued)

FOREIGN PATENT DOCUMENTS

| JP | 2004-126968 | 4/2004 |
| JP | 2008-235696 | 10/2008 |

(Continued)

OTHER PUBLICATIONS

Chinese Office Action issued Aug. 9, 2012 in corresponding Chinese Patent Application No. 201010224824.9.

(Continued)

Primary Examiner — Emerson Puente
Assistant Examiner — Charles Swift
(74) Attorney, Agent, or Firm — Staas & Halsey LLP

(57) ABSTRACT

A job assigning apparatus connected to a plurality of arithmetic units for assigning a job to each of the arithmetic units, the job assigning apparatus includes a power consumption acquiring processor for acquiring power consumptions with respect to each of the arithmetic units, a selector for selecting one of the arithmetic units as a submission destination in increasing order of the power consumptions acquired by the power consumption acquiring processor, and a job submitting processor for submitting a job to the submission destination.

11 Claims, 24 Drawing Sheets

(56) References Cited

U.S. PATENT DOCUMENTS

| | | |
|---|---|---|
| 2006/0095911 A1* | 5/2006 | Uemura et al. ............... 718/100 |
| 2006/0095913 A1* | 5/2006 | Bodas et al. ................. 718/100 |
| 2006/0282689 A1* | 12/2006 | Tipley .......................... 713/300 |
| 2007/0180117 A1 | 8/2007 | Matsumoto et al. |
| 2007/0220294 A1* | 9/2007 | Lippett ......................... 713/320 |
| 2007/0234088 A1* | 10/2007 | Marshall et al. ............. 713/320 |
| 2007/0240163 A1* | 10/2007 | Conrad et al. ................ 718/107 |
| 2007/0260895 A1 | 11/2007 | Aguilar, Jr. et al. |
| 2007/0283358 A1* | 12/2007 | Kasahara et al. ............. 718/104 |
| 2008/0172398 A1* | 7/2008 | Borkenhagen et al. ....... 707/100 |
| 2008/0184230 A1 | 7/2008 | Leech et al. |
| 2008/0232974 A1 | 9/2008 | Tsuchiya |
| 2008/0271030 A1* | 10/2008 | Herington .................... 718/104 |
| 2008/0271035 A1* | 10/2008 | Yasukawa .................... 718/104 |
| 2008/0307244 A1* | 12/2008 | Bertelsen et al. ............. 713/323 |
| 2009/0007128 A1 | 1/2009 | Borghetti et al. |
| 2009/0083263 A1* | 3/2009 | Felch et al. ...................... 707/5 |
| 2009/0089782 A1 | 4/2009 | Johnson et al. |
| 2009/0100437 A1 | 4/2009 | Coskun et al. |
| 2009/0235263 A1 | 9/2009 | Furukawa |
| 2009/0327778 A1* | 12/2009 | Shiga et al. .................. 713/320 |

FOREIGN PATENT DOCUMENTS

| | | |
|---|---|---|
| JP | 2008-242614 | 10/2008 |
| JP | 2009-223637 | 10/2009 |
| WO | WO 03/083693 A1 | 10/2003 |

OTHER PUBLICATIONS

Extended European Search Report mailed Aug. 13, 2013 in corresponding European Application No. 10166698.0.

* cited by examiner

FIG. 3

| ∠211 | |
|---|---|
| ARITHMETIC UNIT ID | STATE OF ARITHMETIC UNIT |
| 1 | OPERATING |
| 2 | NONOPERATING |
| 3 | OPERATING |
| ... | ... |

FIG. 4

| NONOPERATING UNIT ID | AMBIENT TEMPERATURE |
|---|---|
| 1 | AA |
| 2 | BB |
| 3 | CC |
| ... | ... |

| NONOPERATING UNIT ID | POWER CONSUMPTION |
|---|---|
| 1 | LL |
| 2 | MM |
| 3 | NN |
| ... | ... |

| ARITHMETIC UNIT ID | POWER CONSUMPTION |
|---|---|
| 1 | PP |
| 2 | QQ |
| 3 | RR |
| ... | ... |

| NONOPERATING UNIT ID | MEMORY POWER CONSUMPTION |
|---|---|
| 1 | XX |
| 2 | YY |
| 3 | ZZ |
| ... | ... |

| 216 | |
|---|---|
| ARITHMETIC UNIT ID | MEMORY POWER CONSUMPTION |
| 1 | UU |
| 2 | VV |
| 3 | WW |
| ... | ... |

JOB ASSIGNING APPARATUS AND JOB ASSIGNMENT METHOD

CROSS-REFERENCE TO RELATED APPLICATION

This application is based upon and claims the benefit of priority of the prior Japanese Patent Application No. 2009-161101, filed on Jul. 7, 2009, the entire contents of which are incorporated herein by reference.

FIELD

The embodiments discussed herein are related to a job assigning apparatus and a job assignment method.

BACKGROUND

In recent years, with the advance of processing capabilities of arithmetic units, the power consumption by an arithmetic unit in executing a job has increased. Thus, an arithmetic unit has generated more heat. Particularly, in a data center where a plurality of arithmetic units are placed, as the number of arithmetic units increases, the amount of heat generated by the arithmetic units increases.

Accordingly, various methods for suppressing the increase of the amount of heat generated in a data center have been studied including a technology that assigns jobs by avoiding biased loads on arithmetic units to prevent overheating of a specific arithmetic unit. For example, a technology has been known which collects differences between maximum allowable temperatures and real operating temperatures of arithmetic units as a parameter for estimating loads on the arithmetic units and assigns jobs in the decreasing order of the collected differences in temperature.

However, the technology in the past has a problem that the entire power consumption in a data center may increase in attempting efficient suppression of increases of the amount of heat generated in the data center.

More specifically, according to the technology in the past, for more efficient suppression of increases of the amount of heat generated in a data center, the maximum allowable temperatures of arithmetic units therein are set higher. Alternatively, the real operating temperatures of the arithmetic units are set lower by increasing the air-conditioning performance in the data center. Thus, the power consumption by the arithmetic units may increase, and more power may be used for the air-conditioning. This increases the entire power consumption by the data center as a result.

The followings are a reference document.

[Patent Document 1] Japanese Laid-open Patent Publication No. 2008-242614

SUMMARY

According to an aspect of the embodiment, a job assigning apparatus connected to a plurality of arithmetic units for assigning a job to each of the arithmetic units, the job assigning apparatus includes a power consumption acquiring processor for acquiring power consumptions with respect to each of the arithmetic units, a selector for selecting one of the arithmetic units as a submission destination of a job in increasing order of the power consumptions acquired by the power consumption acquiring processor, and a job submitting processor for submitting a job to the submission destination.

According to another aspect of the embodiment, a job assigning apparatus connected to a plurality of arithmetic units for assigning a job to each of the arithmetic units including a memory, the job assigning apparatus includes a power consumption acquiring processor for acquiring memory power consumptions with respect to each of the memories, a selector for selecting one of the arithmetic units as a submission destination of a job in increasing order of the memory power consumptions acquired by the power consumption acquiring processor, and a job submitting processor for submitting a job to the submission destination.

According to another aspect of the embodiment, a job assignment method for controlling to a job assigning apparatus connected to a plurality of arithmetic units for assigning a job to each of the arithmetic units, the job assignment method includes acquiring power consumptions with respect to each of the arithmetic units, selecting one of the arithmetic units as a submission destination of a job in increasing order of the acquired power consumptions, and submitting a job to the submission destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of an arithmetic-unit information table.

FIG. 4 illustrates an example of an ambient-temperature information table.

FIG. 8 illustrates an example of a power-consumption information table.

FIG. 12 illustrates an example of a power-consumption information table.

FIG. 16 illustrates an example of a memory power-consumption information table.

FIG. 20 illustrates an example of a memory power-consumption information table.

DESCRIPTION OF EMBODIMENTS

Preferred embodiments of the present techniques will be explained with reference to accompanying drawings.

With reference to drawings, embodiments of a job assigning apparatus, job assignment method and job assignment program disclosed by the present application will be described in detail below.

First Embodiment

Figure 1:
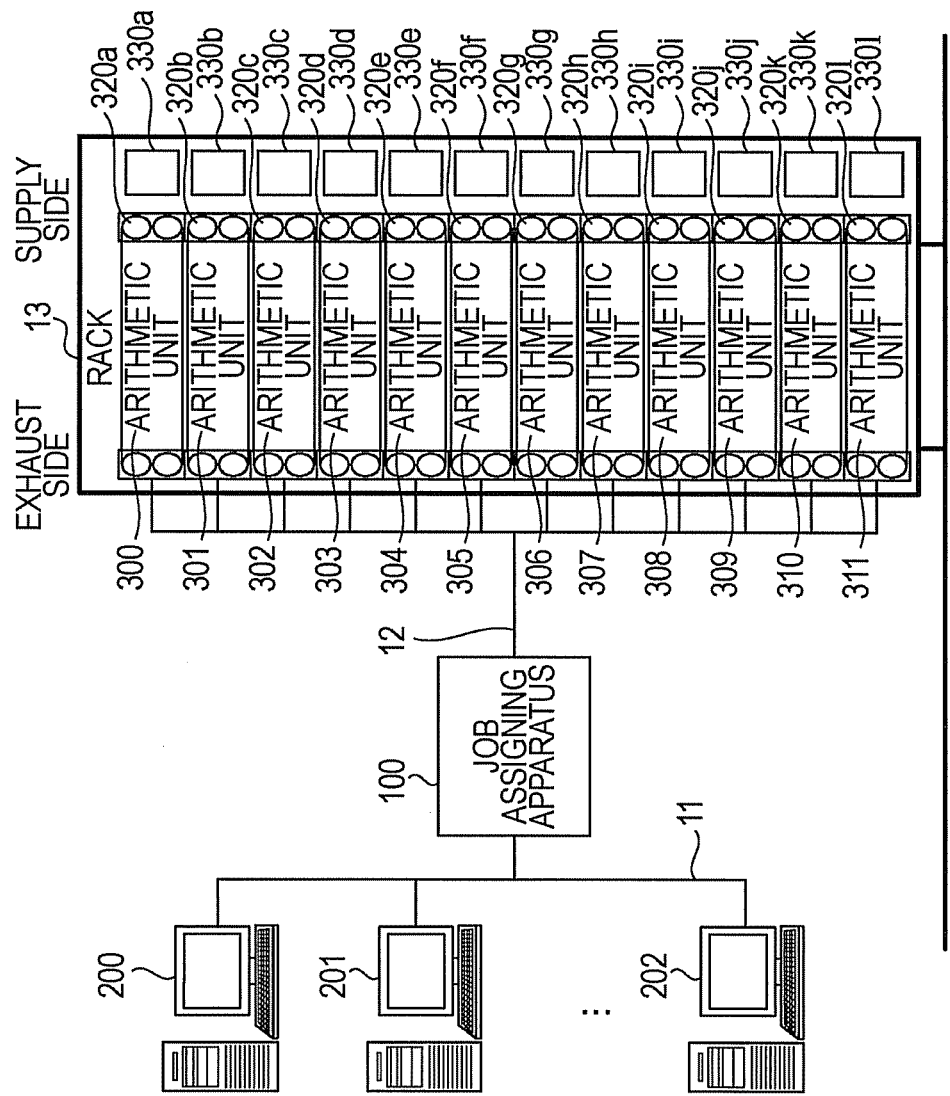
FIG. 1 illustrates a configuration of a data center according to a first embodiment.

First of all, there will be described a configuration of a data center where a job assigning apparatus according to a first embodiment of the present techniques is provided will be described. FIG. 1 illustrates a configuration of a data center according to the first embodiment.

As illustrated in FIG. 1, in a data center according to this embodiment, client apparatuses 200 to 202 and a job assigning apparatus 100 are connected over a predetermined network 11, and arithmetic units 300 to 311 and the job assigning apparatus 100 are connected over a predetermined network 12. The network 11 and the network 12 may be the same network. Any numbers of client apparatuses and arithmetic units may be provided.

The client apparatuses 200 to 202 are terminal apparatuses to be operated by users of the data center. The client apparatuses 200 to 202 receive jobs requesting the data center to execute from users and transmit the jobs to the job assigning apparatus 100.

The arithmetic units 300 to 311 are information processing apparatuses that execute jobs submitted from the job assigning apparatus 100. The arithmetic units 300 to 311 are vertically stacked and accommodated in an indoor rack 13 in the data center. The arithmetic units 300 to 311 have supply and exhaust devices 320a to 320l such as fans attached. The supply and exhaust devices 320a to 320l supply cold air to the arithmetic units from one end (air-intake side) and exhaust air from the other end (exhaust side) to cool the arithmetic units. The air-intake side of the arithmetic units 300 to 311 has temperature sensors 330a to 330l connected to the job assigning apparatus 100 over the network 12.

The job assigning apparatus 100 assigns and submits jobs requested from the client apparatuses 200 to 202 to the arithmetic units 300 to 311. More specifically, if the job assigning apparatus 100 is instructed to submit a job from one of the client apparatuses 200 to 202, the job assigning apparatus 100 first searches nonoperating units which are the arithmetic units not executing jobs in a plurality of arithmetic units 300 to 311. For example, in the example illustrated in FIG. 1, the job assigning apparatus 100 searches the arithmetic units 300 to 302 which are not executing jobs as the nonoperating units.

Next, the job assigning apparatus 100 collects ambient temperatures of the searched nonoperating units from the nonoperating units. In the example illustrated in FIG. 1, the job assigning apparatus 100 collects the temperatures on the air-intake side (or the upstream of cold air supplied by the supply and exhaust devices 320a to 320c) of the arithmetic units 300 to 302 being nonoperating units as the ambient temperatures of the nonoperating units from the temperature sensors 330a to 330c corresponding to the arithmetic units 300 to 302. It is assumed here that ambient temperatures of the arithmetic units 300 to 302 being nonoperating units are T1 to T3 (T1<T2<T3).

Next, the job assigning apparatus 100 selects a nonoperating unit as a submission destination of the job in the increasing order of the collected ambient temperatures. In the example illustrated in FIG. 1, since the arithmetic units 300 to 302 being nonoperating units have ambient temperatures of T1 to T3 (T1<T2<T3), the job assigning apparatus 100 selects the arithmetic unit 300, 301 and 302 in the order as the submission destinations of jobs.

Next, the job assigning apparatus 100 submits the job requested by one of the client apparatuses 200 to 202 to the selected submission destination. In other words, the job assigning apparatus 100 submits a job to the nonoperating unit in the increasing order of ambient temperatures.

In this way, the job assigning apparatus 100 according to the first embodiment collects ambient temperatures of nonoperating units included in the arithmetic units before assigning a job to one of the arithmetic units, selects a nonoperating unit in the increasing order of the collected ambient temperatures as the submission destinations of jobs and submits the job to the selected submission destination. Thus, both of the heat generated and power consumption by the arithmetic units due to the execution of jobs may be suppressed without setting higher maximum allowable temperatures of arithmetic units included in a data center and/or without increasing the air-conditioning performance of the data center. This results in the suppression of the entire increases of the amount of heat generated and power consumption in the data center.

Figure 2:
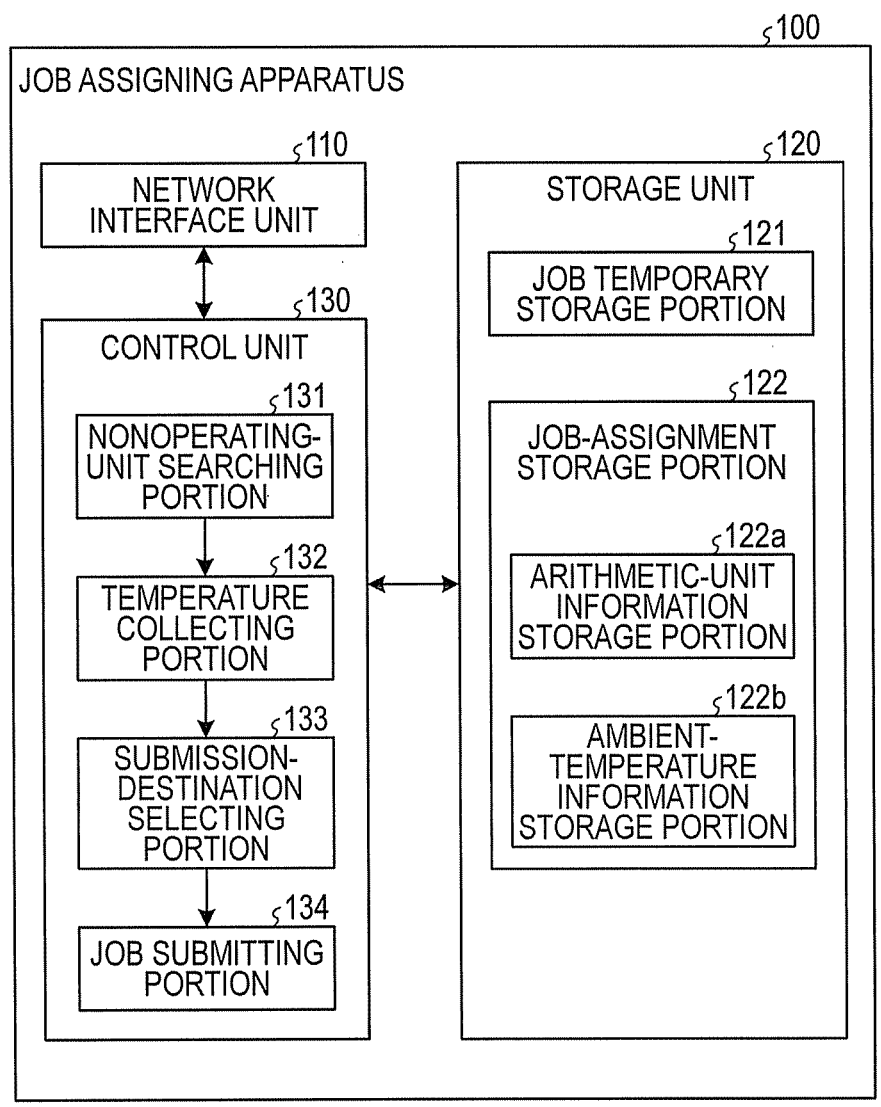
FIG. 2 is a function block diagram illustrating the job assigning apparatus in FIG. 1.

Next, the job assigning apparatus 100 illustrated in FIG. 1 will be described. FIG. 2 is a function block diagram illustrating the job assigning apparatus 100 in FIG. 1. As illustrated in FIG. 2, the job assigning apparatus 100 has a network interface unit 110, a storage unit 120, and a control unit 130.

The network interface unit 110 is an interface for exchange of information and jobs with the client apparatuses 200 to 202 and arithmetic units 300 to 311 over the networks 11 and 12.

The storage unit 120 stores data and programs used for processing by the control unit 130. The storage unit 120 has a job temporary storage portion 121 and a job-assignment storage portion 122. The job temporary storage portion 121 temporarily stores by the job assigning apparatus 100 the jobs received from the client apparatuses 200 to 202.

The job-assignment storage portion 122 holds information used for performing processing by a submission-destination selecting portion 133, which will be described later, for example, in the control unit 130. The job-assignment storage portion 122 has an arithmetic-unit information storage portion 122a and an ambient-temperature information storage portion 122b.

The arithmetic-unit information storage portion 122a stores an arithmetic-unit information table having information on whether an arithmetic unit is currently executing a job or not. FIG. 3 illustrates an example of the arithmetic-unit information table stored in the arithmetic-unit information storage portion 122a. As illustrated on an arithmetic-unit information table 211 in FIG. 3, the arithmetic-unit information storage portion 122a stores arithmetic-unit information of an arithmetic unit ID and a state of the arithmetic unit. The arithmetic-unit information is stored for each arithmetic unit.

The arithmetic unit ID is an identifier for identifying an arithmetic unit. The state of the arithmetic unit refers to the state of execution of a job by the corresponding arithmetic unit. While an arithmetic unit is executing a job, the state of the arithmetic unit has a value for "operating". While an arithmetic unit is not executing a job, the state of the arithmetic unit has a value for "nonoperating". The states of arithmetic units are collected from the arithmetic units 300 to 311 by the nonoperating-unit searching portion 131, which will be described later, included in the control unit 130 and are written to the arithmetic-unit information table 211.

The ambient-temperature information storage portion 122b stores an ambient-temperature information table having information on ambient temperatures of nonoperating units which are arithmetic units not executing jobs of a plurality of arithmetic units. FIG. 4 illustrates an example of the ambient-temperature information table stored in the ambient-temperature information storage portion 122b. As illustrated in the ambient-temperature information table 212 in FIG. 4, the ambient-temperature information storage portion 122b stores ambient-temperature information of a nonoperating unit ID and an ambient temperature. The ambient-temperature information is stored for each nonoperating unit.

The nonoperating unit ID is an identifier for identifying a nonoperating unit included in a plurality of arithmetic units. The ambient temperature is an ambient temperature of a nonoperating unit. The ambient temperatures are collected by a temperature collecting portion 132, which will be described later, included in the control unit 130 and are written to the ambient-temperature information table 212.

The control unit 130 has an internal memory for storing programs and data defining processing routines and uses them to execute various kinds of processing. Particularly, the control unit 130 has the nonoperating-unit searching portion 131, temperature collecting portion 132, and submission-destination selecting portion 133, and a job submitting portion 134.

When receiving a job submission instruction from one of the client apparatuses 200 to 202, the nonoperating-unit searching portion 131 searches nonoperating units which are arithmetic units not executing jobs in a plurality of arithmetic units 300 to 311. More specifically, the nonoperating-unit searching portion 131 monitors job execution states of arithmetic units at all times, and writes the collected job execution states to the states of arithmetic units in the arithmetic-unit information storage portion 122a. When receiving a job submission instruction from one of the client apparatuses 200 to 202, the nonoperating-unit searching portion 131 refers to the arithmetic-unit information storage portion 122a and searches an arithmetic unit ID having "nonoperating" as the state of the arithmetic unit.

If no nonoperating units are found, the nonoperating-unit searching portion 131 executes job-submission waiting processing and waits for another job submission instruction from one of the client apparatuses 200 to 202. The job-submission waiting processing here may be, for example, processing of requesting the client apparatus having issued a job submission instruction to wait the job submission for a predetermined period of time.

The temperature collecting portion 132 collects ambient temperatures of the searched nonoperating unit. More specifically, the temperature collecting portion 132 stores the arithmetic unit IDs identifying the nonoperating units searched by the nonoperating-unit searching portion 131 as the nonoperating unit IDs in the ambient-temperature information storage portion 122b. The temperature collecting portion 132 acquires the ambient temperatures of the arithmetic units identified from the nonoperating unit ID from the temperature sensors corresponding to the arithmetic units and stores the acquired ambient temperatures as the ambient temperature corresponding to the nonoperating unit ID.

The ambient temperatures of the searched nonoperating units acquired by the temperature collecting portion 132 may be temperatures on the air-intake sides (or the upstream of the cold air supplied by the supply and exhaust device 320a to 320c) of the nonoperating units from the temperature sensors corresponding to the nonoperating unit. Acquiring a temperature on the air-intake side of a nonoperating unit as the ambient temperature of the nonoperating unit allows acquisition of an accurate ambient temperature before affected by the heat generated by the nonoperating unit itself.

The submission-destination selecting portion 133 selects a nonoperating unit in the increasing order of the collected ambient temperatures as the submission destination of the job. More specifically, the submission-destination selecting portion 133 selects a plurality of nonoperating unit IDs in the increasing order of ambient temperatures from the ambient-temperature information storage portion 122b and transmits the order of selection and the nonoperating unit IDs in association to the job submitting portion 134.

The job submitting portion 134 submits a job to the submission destination selected by the submission-destination selecting portion 133. More specifically, the job submitting portion 134 receives the information having association between the order of selection and the nonoperating unit IDs from the submission-destination selecting portion 133 and submits the job to the nonoperating unit identified from the nonoperating unit ID in the order of selection. In other words, the job submitting portion 134 submits the job to one of the nonoperating units in the increasing order of ambient temperatures.

Figure 5:
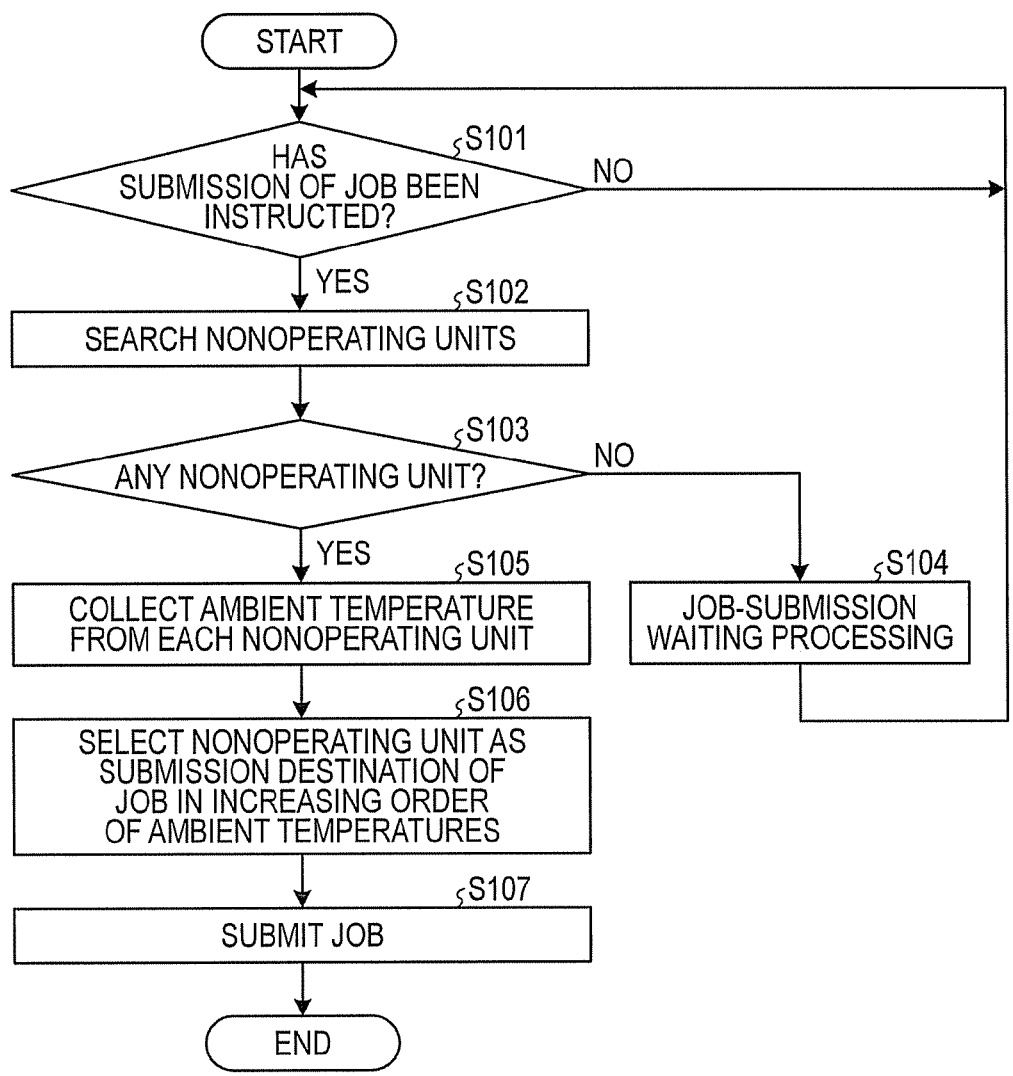
FIG. 5 is a flowchart illustrating a processing routine of job assignment processing by a job assigning apparatus according to the first embodiment.

Next, there will be described a processing routine of job assignment processing by the job assigning apparatus 100 according to the first embodiment. FIG. 5 is a flowchart illustrating a processing routine of job assignment processing by the job assigning apparatus 100 according to the first embodiment. The flowchart in FIG. 5 illustrates a processing routine from the retrieval by the job assigning apparatus 100 of a job stored in the job temporary storage portion 121 to the assignment and submission of the retrieved job to one of the arithmetic units 300 to 311. The job assigning apparatus 100 repeats the processing routine.

When retrieving jobs from the job temporary storage portion 121, the nonoperating-unit searching portion 131 determines whether a client apparatus has issued a job submission instruction or not (step S101) as illustrated in FIG. 5. If not as a result of the determination (No in step S101), the nonoperating-unit searching portion 131 waits for a job submission instruction from a client apparatus.

If so on the other hand (Yes in step S101), the nonoperating-unit searching portion 131 searches nonoperating units that are not executing jobs in the plurality of arithmetic units 300 to 311 (step S102). The nonoperating-unit searching portion 131 then determines whether any nonoperating unit is present or not (step S103).

If not as result (No in step S103), the nonoperating-unit searching portion 131 executes the job-submission waiting processing (step S104) and waits for another job submission instruction from a client apparatus.

If so (Yes in step S103) on the other hand, the nonoperating-unit searching portion 131 notifies the searched nonoperating units to the temperature collecting portion 132. The temperature collecting portion 132 having received the notification from the nonoperating-unit searching portion 131 collects the ambient temperature or temperatures of the searched nonoperating units (step S105).

Next, the submission-destination selecting portion 133 selects one of the nonoperating units in the increasing order of the collected ambient temperatures as the submission destinations of the job (step S106). The job submitting portion 134 submits the job to the selected submission destination (step S107).

In this way, the job assigning apparatus 100 according to the first embodiment collects ambient temperatures of nonoperating units included in arithmetic units, selects a nonoperating unit in the increasing order of the collected ambient temperatures as the submission destination of a job and submits the job to the selected submission destination. Thus, both of the heat generated and power consumption by the arithmetic units due to the execution of jobs may be suppressed without setting higher maximum allowable temperatures of arithmetic units included in a data center and/or without increasing the air-conditioning performance of the data center. This results in the suppression of the entire increases of the amount of heat generated and power consumption in the data center.

According to the first embodiment, the temperatures of the air-intake side (or the upstream of the cold air supplied by the supply and exhaust device) of nonoperating units are collected as ambient temperatures of the nonoperating units. Thus, the collected ambient temperatures may be accurate ones before affected by the heat generated from the nonoperating units themselves. Furthermore, nonoperating units with ambient temperatures as low as possible may be properly selected as the submission destinations of jobs. Therefore, the heat generated and power consumption by the arithmetic units due to the execution of jobs may be properly suppressed. As a result, the increases of the entire heat generated and power consumption in a data center may be properly suppressed.

Second Embodiment

According to the first embodiment, jobs are submitted to nonoperating units in the increasing order of ambient temperatures. However, jobs may be submitted to nonoperating units in the increasing order of power consumptions. According to a second embodiment of the present techniques, there will be described a job assigning apparatus that submits jobs to nonoperating units in the increasing order of power consumptions.

Figure 6:
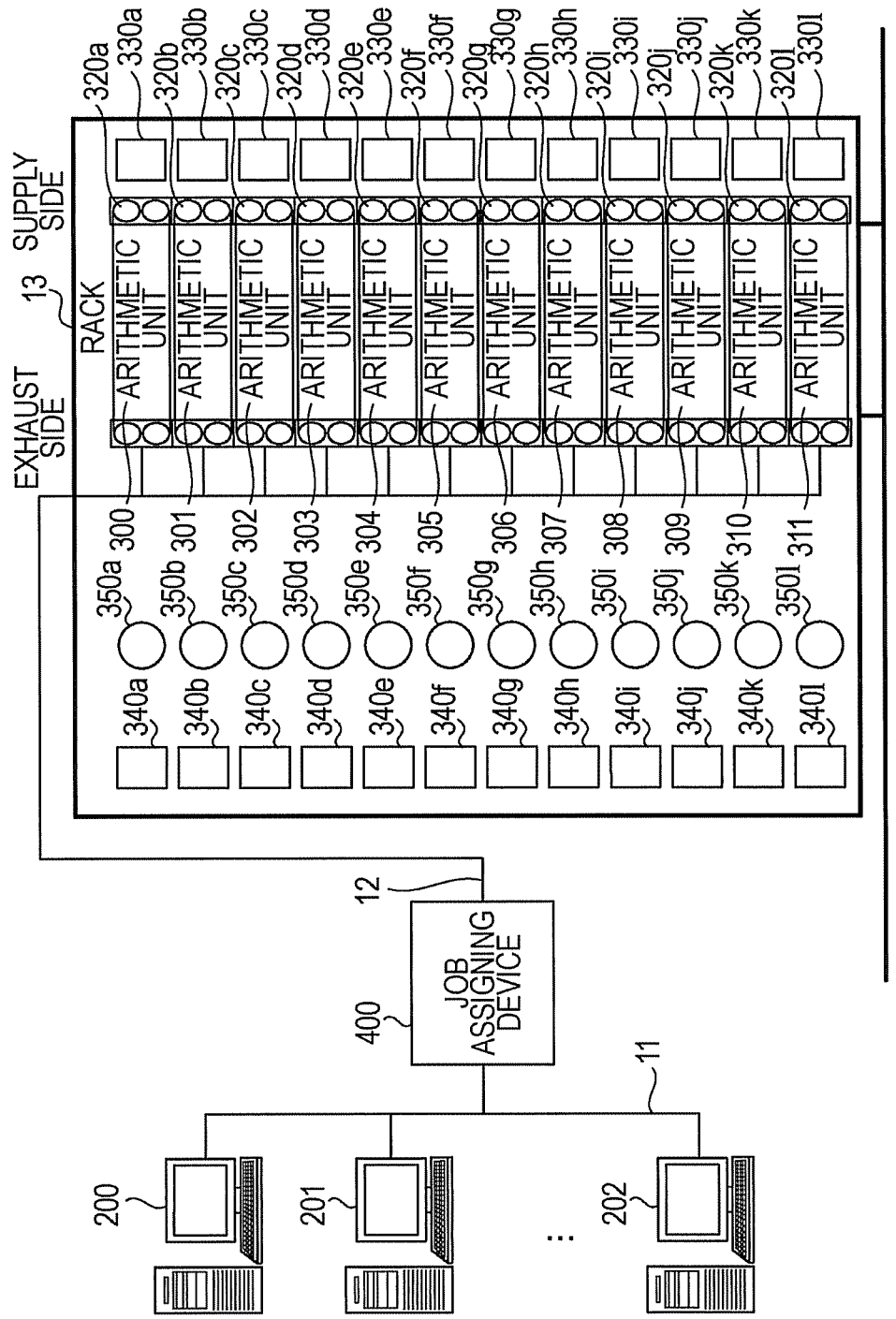
FIG. 6 illustrates a configuration of a data center according to a second embodiment.

First of all, there will be described a configuration of a data center where a job assigning apparatus according to the second embodiment will be described. FIG. 6 illustrates a configuration of a data center according to the second embodiment. Like numerals refer to the components having like functions to the components already described according to the first embodiment, and the detail descriptions will be omitted.

As illustrated in FIG. 6, in a data center according to this embodiment, a client apparatuses 200 to 202 and a job assigning apparatus 400 are connected over a predetermined network 11, and arithmetic units 300 to 311 and the job assigning apparatus 400 are connected over a predetermined network 12.

The air-intake sides of the arithmetic units 300 to 311 have temperature sensors 330a to 330l connected to the job assigning apparatus 100 over the network 12. The exhaust side of the arithmetic units 300 to 311 has temperature sensors 340a to 340l and air-volume sensors 350a to 350l connected to the job assigning apparatus 400 over the network 12.

The job assigning apparatus 400 assigns and submits jobs requested from the client apparatuses 200 to 202 to the arithmetic units 300 to 311. More specifically, if the job assigning apparatus 400 is instructed to submit a job from one of the client apparatuses 200 to 202, the job assigning apparatus 400 first searches nonoperating units which are arithmetic units not executing jobs in a plurality of arithmetic units 300 to 311. For example, in the example illustrated in FIG. 6, the job assigning apparatus 400 searches the arithmetic units 300 to 302 which are not executing jobs as the nonoperating units.

Next, the job assigning apparatus 400 collects ambient temperatures of the searched nonoperating units. In the example illustrated in FIG. 6, the job assigning apparatus 400 collects the temperatures on the air-intake and exhaust sides (or the upstream and downstream of cold air supplied by the supply and exhaust devices 320a to 320c) of the arithmetic units 300 to 302 being nonoperating units as the ambient temperatures of the nonoperating units from the temperature sensors 330a to 330c and temperature sensors 340a to 340c corresponding to the arithmetic units 300 to 302.

The job assigning apparatus 400 further collects the volumes of cold air supplied from the supply and exhaust devices 320a to 320c attached to the searched nonoperating units. In the example illustrated in FIG. 6, the job assigning apparatus 400 collects the volumes of air on the exhaust side (or the downstream of cold air supplied by the supply and exhaust devices 320a to 320c) of the arithmetic units 300 to 302 being nonoperating units from the air-volume sensors 350a to 350c corresponding to the arithmetic units 300 to 302.

Next, the job assigning apparatus 400 calculates the power consumptions by the nonoperating units on the basis of the collected ambient temperatures and volumes of air. Then, the job assigning apparatus 400 selects one nonoperating unit as a submission destination of the job in the increasing order of the calculated power consumptions. The job assigning apparatus 400 then submits the job to the selected submission destination.

In this way, the job assigning apparatus 400 according to the second embodiment calculates the power consumptions of nonoperating units included in the arithmetic units before assigning a job to one of the arithmetic units, selects a nonoperating unit in the increasing order of the calculated power consumptions as the submission destination of the job and submits the job to the selected submission destination. Thus, like the first embodiment, both of the heat generated and power consumption by the arithmetic units due to the execution of jobs may be suppressed without setting higher maximum allowable temperatures of arithmetic units included in a data center and/or without increasing the air-conditioning performance of the data center. This results in the entire increases of both of the heat generated and power consumption in the data center.

Figure 7:
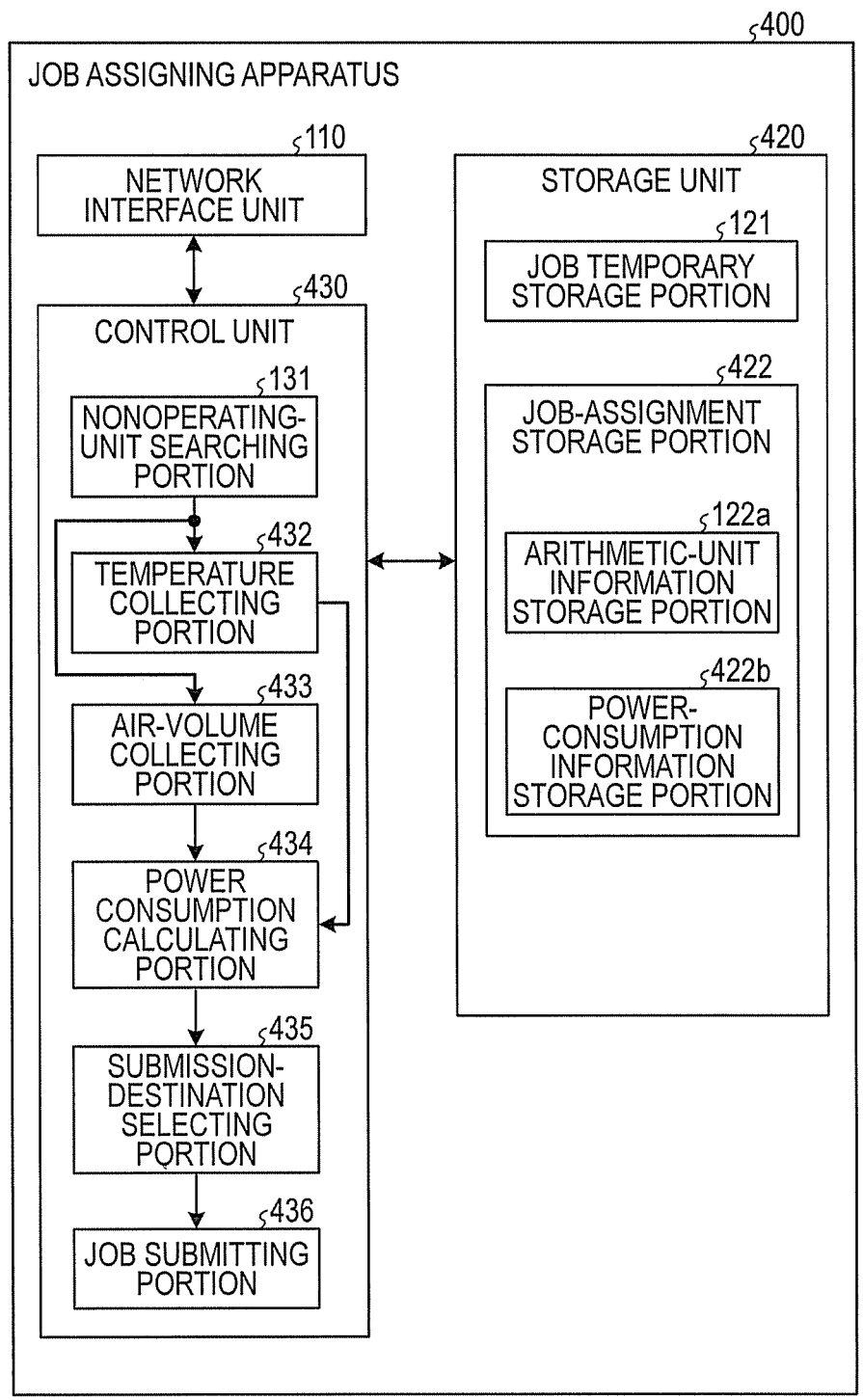
FIG. 7 is a function block diagram illustrating the job assigning apparatus in FIG. 6.

Next, the job assigning apparatus 400 illustrated in FIG. 6 will be described. FIG. 7 is a function block diagram illustrating the job assigning apparatus 400 in FIG. 6. As illustrated in FIG. 7, the job assigning apparatus 400 has a network interface unit 110, a storage unit 420, and a control unit 430.

The storage unit 420 stores data and programs used for processing by the control unit 430. The storage unit 420 has a job temporary storage portion 121 and a job-assignment storage portion 422.

The job-assignment storage portion 422 holds information used for performing processing by a submission-destination selecting portion 435, which will be described later, for example, in the control unit 430. The job-assignment storage portion 422 has an arithmetic-unit information storage portion 122a and a power-consumption information storage portion 422b.

The power-consumption information storage portion 422b stores a power-consumption information table having information on power consumptions of nonoperating units which are arithmetic units not executing jobs of a plurality of arithmetic units. FIG. 8 illustrates an example of the power-consumption information table stored in the power-consumption information storage portion 422b. As illustrated in the power-consumption information table 213 in FIG. 8, the power-consumption information storage portion 422b stores power-consumption information of nonoperating unit IDs and power consumptions. The power-consumption information is registered for each nonoperating unit.

The nonoperating unit ID is an identifier for identifying a nonoperating unit included in a plurality of arithmetic units. The power consumption is a power consumption by a nonoperating unit. The power consumptions are acquired and collected by a power-consumption calculating portion 434, which will be described later, included in the control unit 430 and are written to the power-consumption information table 213.

The control unit 430 has an internal memory for storing programs and data defining processing routines and uses them to execute various kinds of processing. Particularly, the control unit 430 has the nonoperating-unit searching portion 131, a temperature collecting portion 432, an air-volume collecting portion 433, a power-consumption calculating portion 434, a submission-destination selecting portion 435, and a job submitting portion 436.

The temperature collecting portion 432 collects ambient temperatures of the searched nonoperating units from the nonoperating units. More specifically, the temperature collecting portion 432 collects the temperatures on the air-intake and exhaust sides (or the upstream and downstream of cold air supplied by the supply and exhaust devices 320a to 320c) of the nonoperating units searched by the nonoperating unit searching portion 131 from the temperature sensors 330a to 330c and temperature sensors 340a to 340c corresponding to the nonoperating units.

The air-volume collecting portion 433 further collects the volumes of cold air supplied from the supply and exhaust devices 320a to 320c attached to the searched nonoperating units from the nonoperating units. More specifically, the air-volume collecting portion 433 collects the volumes of air on the exhaust side (or the downstream of cold air supplied by the supply and exhaust devices 320a to 320c) of the nonoperating units searched by the nonoperating unit searching portion 131 from the air-volume sensors 350a to 350c corresponding to the nonoperating units.

The power-consumption calculating portion 434 calculates the power consumptions by the nonoperating units on the basis of the collected ambient temperatures and volumes of air. How a power consumption for each nonoperating unit is calculated will be described below. When the temperature on the air-intake side of a nonoperating unit collected by the temperature collecting portion 432 is Tinn, the temperature on the exhaust side of the nonoperating unit collected by the temperature collecting portion 432 is Tout, the volume of air on the exhaust side of the nonoperating unit collected by the air-volume collecting portion 433 is Q, the density of air is p, and the specific heat of air is c, a power consumption P for each nonoperating unit is expressed by:

$$P = c*p*Q*(Tout - Tin) \quad \text{[Expression 1]}$$

The power-consumption calculating portion 434 stores the arithmetic unit IDs identifying the nonoperating units searched by the nonoperating-unit searching portion 131 as the nonoperating unit IDs in the power-consumption information storage portion 422b. The power-consumption calculating portion 434 stores the power consumptions P for the nonoperating units calculated by Expression 1 as the power consumptions corresponding to the nonoperating unit IDs.

The submission-destination selecting portion 435 selects one of the nonoperating units in the increasing order of the calculated power consumptions as the submission destination of the job. More specifically, the submission-destination selecting portion 435 selects a plurality of nonoperating unit IDs in the increasing order of power consumptions from the power-consumption information storage portion 422b and transmits the order of selection and the nonoperating unit IDs in association to the job submitting portion 436.

The job submitting portion 436 submits a job to the submission destination selected by the submission-destination selecting portion 435. More specifically, the job submitting portion 436 receives the information having association between the order of selection and the nonoperating unit IDs from the submission-destination selecting portion 435 and submits a job to the nonoperating unit identified from the nonoperating unit ID in the order of selection. In other words, the job submitting portion 436 submits the job to one of the nonoperating units in the increasing order of power consumptions.

Figure 9:
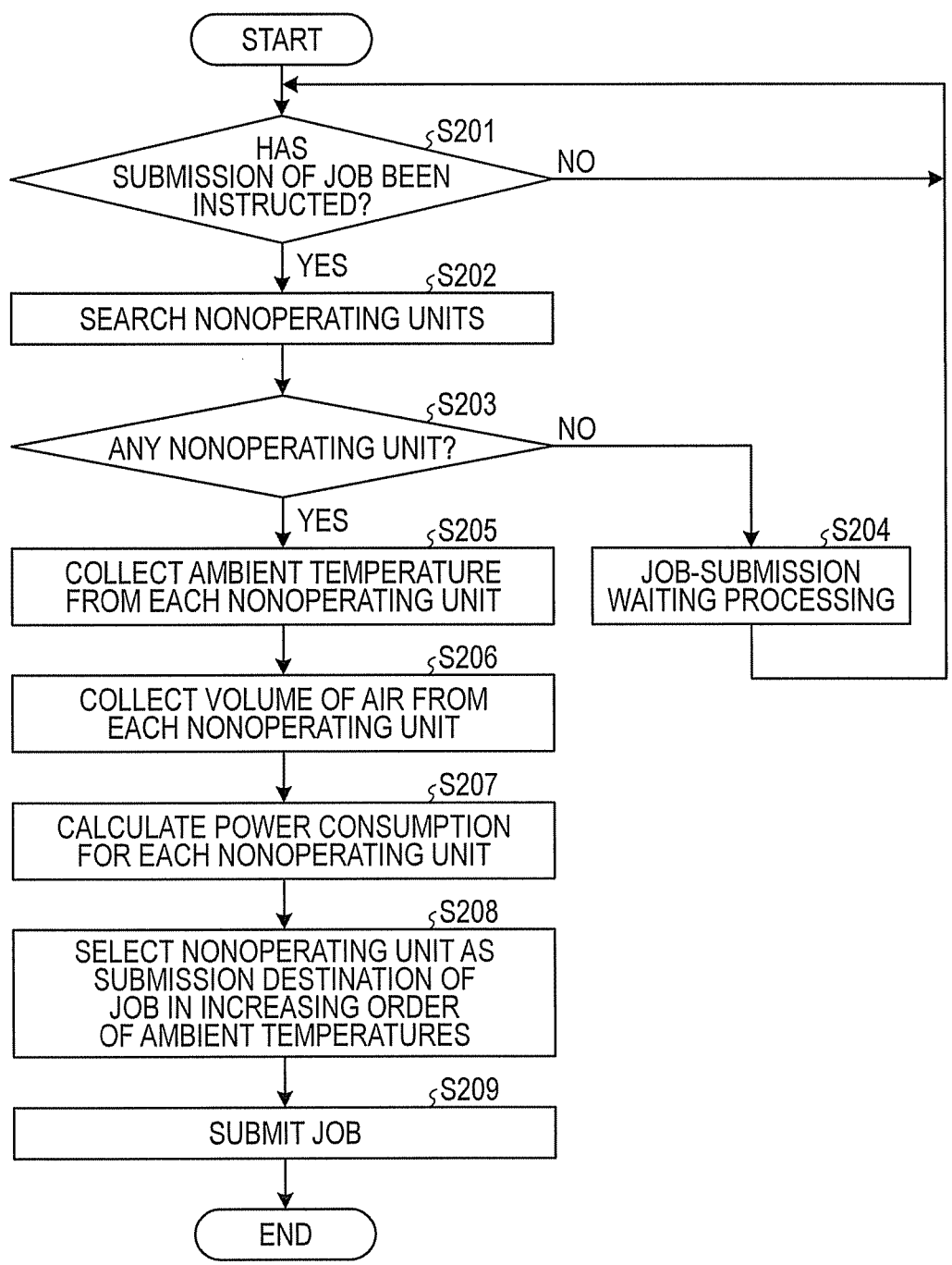
FIG. 9 is a flowchart illustrating a processing routine of job assignment processing by a job assigning apparatus according to the second embodiment.

Next, there will be described a processing routine of job assignment processing by the job assigning apparatus 400 according to the second embodiment. FIG. 9 is a flowchart illustrating a processing routine of job assignment processing by the job assigning apparatus 400 according to the second embodiment. The flowchart in FIG. 9 illustrates a processing routine from the retrieval by the job assigning apparatus 400 of a job stored in the job temporary storage portion 121 to the assignment and submission of the retrieved job to one of the arithmetic units 300 to 311. The job assigning apparatus 400 repeats the processing routine. Since steps S201 to S204 illustrated in FIG. 9 correspond to steps S101 to S104 in FIG. 5, they will be described briefly.

As illustrated in FIG. 9, if the job assigning apparatus 400 receives a job submission instruction from a client apparatus and determines that some nonoperating units are present (Yes in step S201 to step S203), the nonoperating-unit searching portion 131 notifies the searched nonoperating units to the temperature collecting portion 432 and air-volume collecting portion 433.

The temperature collecting portion 432 having received the notification from the nonoperating-unit searching portion 131 collects the ambient temperatures of the searched nonoperating units (step S205). The air-volume collecting portion 433 having received the notification from the nonoperating-unit searching portion 131 collects the volumes of cold air supplied from the supply and exhaust devices 320a to 320c attached to the searched nonoperating units (step S206).

On the basis of the collected ambient temperatures and volumes of air, the power-consumption calculating portion 434 calculates the power consumptions by the nonoperating units (step S207). Next, the submission-destination selecting portion 435 selects one of the nonoperating units in the increasing order of the calculated power consumptions as the submission destination of the job (step S208). The job submitting portion 436 submits the job to the selected submission destination (step S209).

In this way, before assigning a job to an arithmetic unit, the job assigning apparatus 400 according to the second embodiment calculates power consumptions of nonoperating units included in arithmetic units, selects one of the nonoperating units in the increasing order of the calculated power consumptions as the submission destination of the job and submits the job to the selected submission destination. Thus, like the first embodiment, both of the heat generated and power consumption by the arithmetic units due to the execution of jobs may be suppressed without setting higher maximum allowable temperatures of arithmetic units included in a data center and/or without increasing the air-conditioning performance of the data center. This results in the suppression of the entire increases of the amount of heat generated and power consumption in the data center.

Third Embodiment

According to the second embodiment, the power consumptions by nonoperating units are calculated, and the calculated power consumptions are used to select the submission destination of a job. However, pre-stored power consumptions of arithmetic units may be used to select the submission destination of a job. According to a third embodiment of the present techniques, there will be described a job assigning apparatus that uses pre-stored power consumptions of arithmetic units to select the submission destination of a job.

Figure 10:
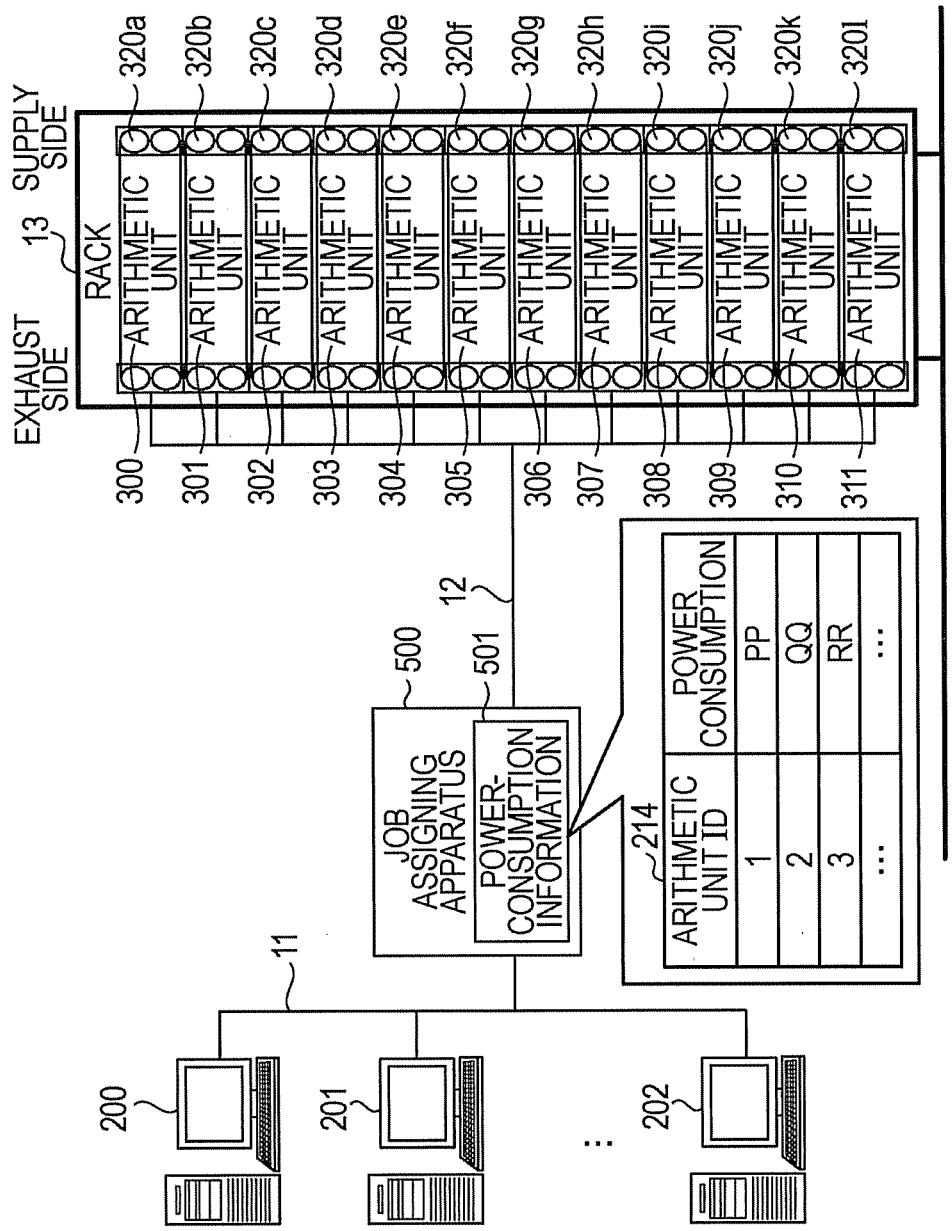
FIG. 10 illustrates a configuration of a data center according to a third embodiment.

First of all, there will be described a configuration of a data center where a job assigning apparatus according to a third embodiment will be described. FIG. 10 illustrates a configuration of a data center according to the third embodiment. Like numerals refer to the components having like functions to the components already described according to the first embodiment, and the detail descriptions will be omitted.

As illustrated in FIG. 10, in a data center according to this embodiment, client apparatuses 200 to 202 and a job assigning apparatus 500 are connected over a predetermined network 11, and arithmetic units 300 to 311 and the job assigning apparatus 500 are connected over a predetermined network 12.

The job assigning apparatus 500 assigns and submits jobs requested from the client apparatuses 200 to 202 to the arithmetic units 300 to 311. More specifically, if the job assigning apparatus 500 is instructed to submit jobs from the client apparatuses 200 to 202, the job assigning apparatus 500 first searches nonoperating units which are arithmetic units not executing jobs in a plurality of arithmetic units 300 to 311. For example, in the example illustrated in FIG. 10, the job assigning apparatus 500 searches the arithmetic units 300 to 302 which are not executing jobs as the nonoperating units.

Next, the job assigning apparatus 500 acquires power consumptions corresponding to the searched nonoperating units from power consumption information 501 for the arithmetic units 300 to 311 which are power consumptions pre-stored when jobs are submitted to the arithmetic units. For example, in the example illustrated in FIG. 10, the job assigning apparatus 500 acquires power consumptions corresponding to the arithmetic units 300 to 302 being nonoperating units from the power consumption information 501.

Next, the job assigning apparatus 500 selects a nonoperating unit as a submission destination of the job in the increasing order of the acquired power consumptions, and the job is submitted to the selected submission destination.

In this way, with the job assigning apparatus 500 according to the third embodiment, both of the heat generated and power consumption by the arithmetic units due to the execution of jobs may be suppressed without setting higher maximum allowable temperatures of arithmetic units included in a data center and/or without increasing the air-conditioning performance of the data center, like the second embodiment. This results in the suppression of the entire increases of the amount of heat generated and power consumption in the data center.

In addition, the job assigning apparatus 500 according to the third embodiment, before assigning a job to an arithmetic unit, acquires power consumptions by nonoperating units from pre-stored power consumptions of arithmetic units, and selects a nonoperating unit as the submission destination of the job in the increasing order of the acquired power consumptions. This allows omission of the processing of calculating power consumptions by nonoperating units and thus may reduce the volume of processing used for selecting submission destinations of jobs.

Figure 11:
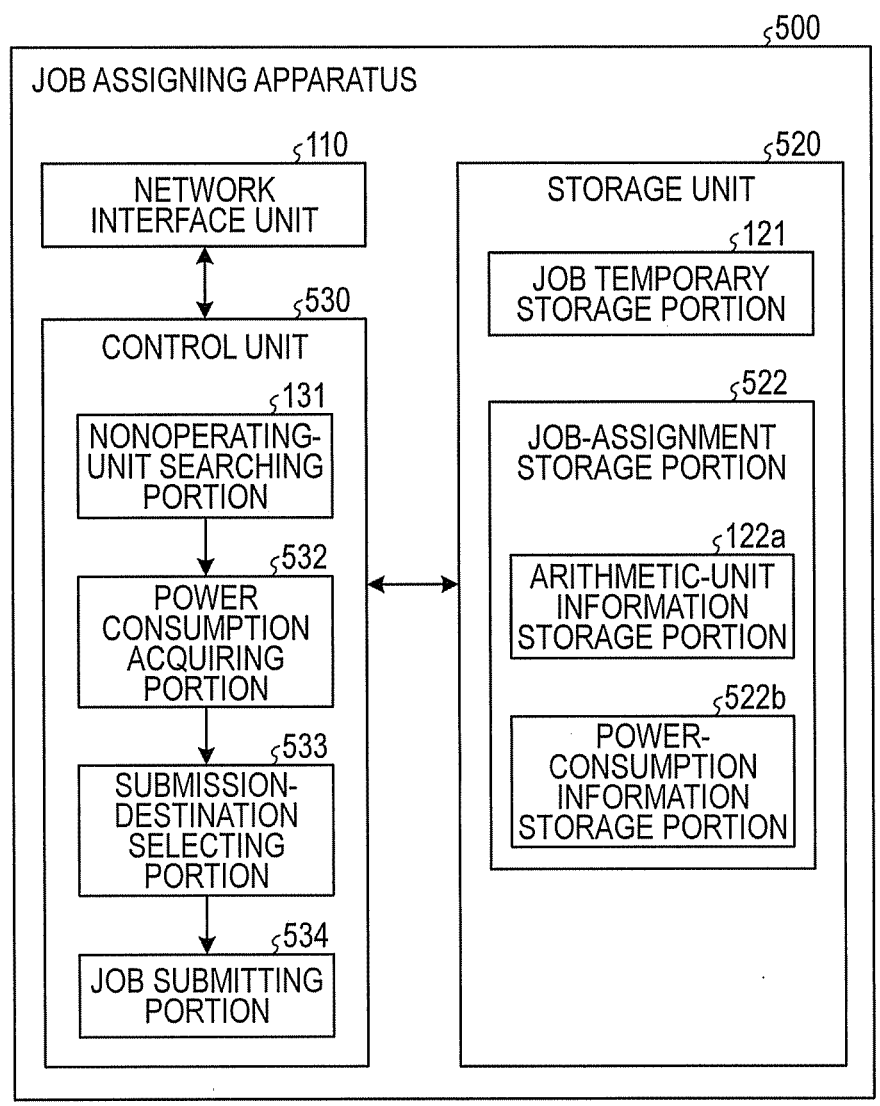
FIG. 11 is a function block diagram illustrating the job assigning apparatus in FIG. 10.

Next, the job assigning apparatus 500 illustrated in FIG. 10 will be described. FIG. 11 is a function block diagram illustrating the job assigning apparatus 500 in FIG. 10. As illustrated in FIG. 11, the job assigning apparatus 500 has a network interface unit 110, a storage unit 520, and a control unit 530.

The storage unit 520 stores data and programs used for processing by the control unit 530. The storage unit 120 has a job temporary storage portion 121 and a job-assignment storage portion 522.

The job-assignment storage portion 522 holds information used for performing processing by a submission-destination selecting portion 533, which will be described later, for example, in the control unit 530. The job-assignment storage portion 122 has an arithmetic-unit information storage portion 122a and a power-consumption information storage portion 522b.

The power-consumption information storage portion 522b stores a power-consumption information table having information on power consumptions when jobs are submitted to arithmetic units. FIG. 12 illustrates an example of the power-consumption information table stored in the power-consumption information storage portion 522b. As illustrated on a power-consumption information table 214 in FIG. 12, the power-consumption information storage portion 522b stores power-consumption information of arithmetic unit IDs and power consumptions. The power-consumption information is stored for each arithmetic unit.

The arithmetic unit ID is an identifier for identifying an arithmetic unit. The power consumption is a power consumption by an arithmetic unit upon submission of a job.

The power consumption may be calculated and stored in advance by the following method, for example: When the electrical resistance of one heater element included in an arithmetic unit is R, the current flowing through one heater element included in the arithmetic unit when a job is submitted to the arithmetic unit is i, and the coefficient depending on the number of clocks of a central processing unit (CPU) included in the arithmetic unit is α, the power consumption W may be expressed by:

$$W = \Sigma(\alpha * R * i^2) \qquad \text{[Expression 2]}$$

The control unit 530 has an internal memory for storing programs and data defining processing routines and uses them to execute various kinds of processing. Particularly, the control unit 530 has the nonoperating-unit searching portion 131, a power-consumption acquiring portion 532, a submission-destination selecting portion 533, and a job submitting portion 534.

The power consumption acquiring portion 532 acquires the power consumptions corresponding to nonoperating units from the power consumption information stored in the power consumption information storage unit 522b. More specifically, the power consumption acquiring portion 532 acquires the power consumptions corresponding to the arithmetic unit IDs indicating the nonoperating units searched by the nonoperating-unit searching portion 131 from the power consumption information stored in the power consumption information storage unit 522b.

The submission-destination selecting portion 533 selects a nonoperating unit in the increasing order of the acquired power consumptions as the submission destination of the job. More specifically, the submission-destination selecting portion 533 selects a plurality of arithmetic unit IDs indicating nonoperating units in the increasing order of power consumptions from the power-consumption information storage portion 522b and transmits data having association between the order of selection and the arithmetic unit IDs indicating nonoperating units to the job submitting portion 534.

The job submitting portion 534 submits a job to the submission destination selected by the submission-destination selecting portion 533. More specifically, the job submitting portion 534 receives the data having association between the order of selection and the arithmetic unit IDs indicating nonoperating units from the submission-destination selecting portion 533 and submits the job to the nonoperating unit identified from the nonoperating unit ID in the order of selection. In other words, the job submitting portion 534 submits the job to one of the nonoperating units in the increasing order of power consumptions.

Figure 13:
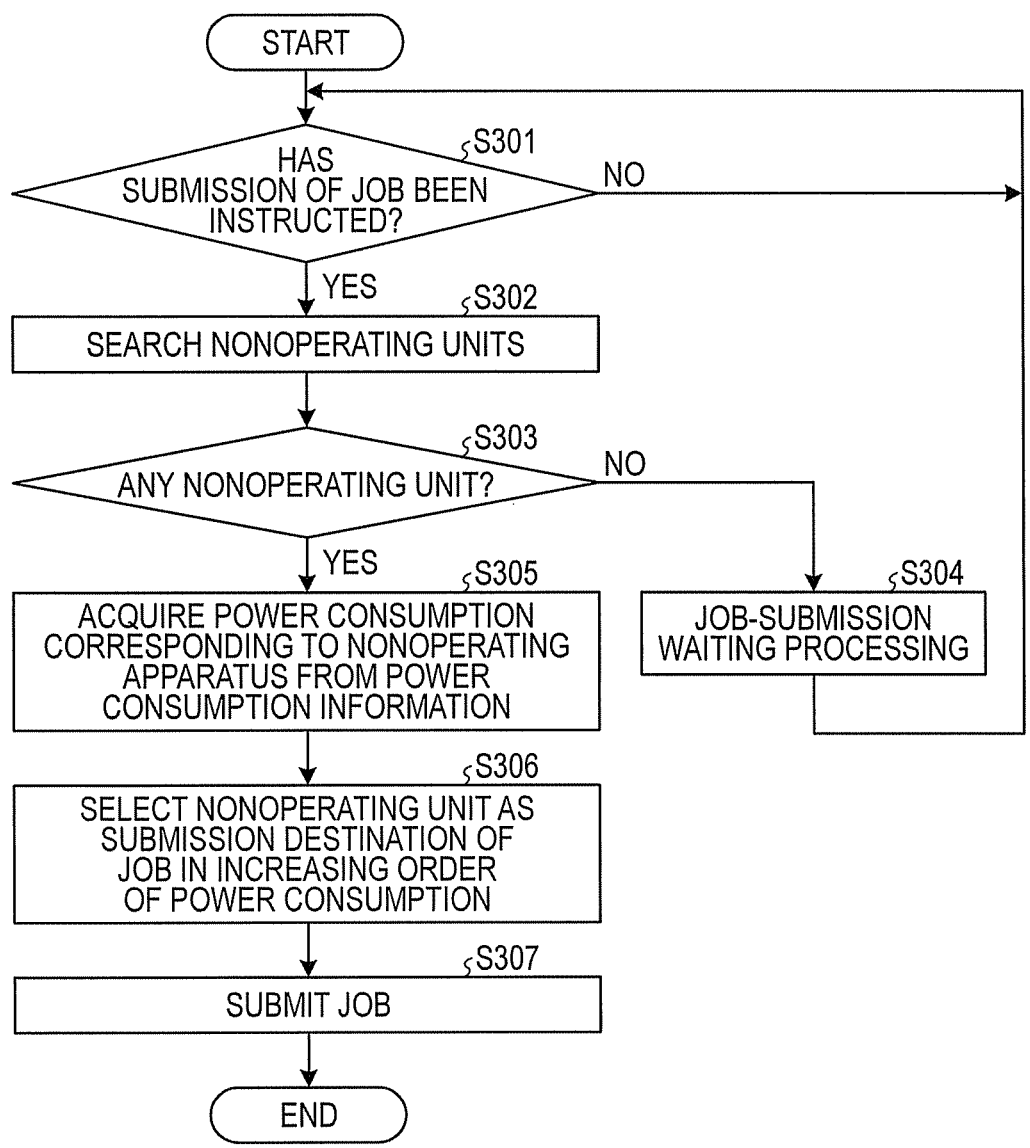
FIG. 13 is a flowchart illustrating a processing routine of job assignment processing by the job assigning apparatus according to the third embodiment.

Next, there will be described a processing routine of job assignment processing by the job assigning apparatus 500 according to the third embodiment. FIG. 13 is a flowchart illustrating a processing routine of job assignment processing by the job assigning apparatus 500 according to the third embodiment. The flowchart in FIG. 13 illustrates a processing routine from the retrieval by the job assigning apparatus 500 of a job stored in the job temporary storage portion 121 to the assignment and submission of the retrieved job to one of the arithmetic units 300 to 311. The job assigning apparatus 500 repeats the processing routine. Since steps S301 to S304 illustrated in FIG. 13 correspond to steps S201 to S204 in FIG. 5, they will be described briefly.

As illustrated in FIG. 13, if the job assigning apparatus 500 receives a job submission instruction from a client apparatus and determines that some nonoperating units are present (Yes in step S301 to step S303), the nonoperating-unit searching portion 131 notifies the searched nonoperating units to the power consumption acquiring portion 532.

The power consumption acquiring portion 532 having received the notification from the nonoperating-unit searching portion 131 acquires the power consumptions corresponding to the nonoperating units from the power consumption information stored in the power consumption information storage unit 522b (step S305).

Next, the submission-destination selecting portion 533 selects one of the nonoperating units in the increasing order of the acquired power consumptions as the submission destinations of the job (step S306). The job submitting portion 534 submits the job to the selected submission destination (step S307).

As described above, with the job assigning apparatus 500 according to the third embodiment, both of the heat generated and power consumption by the arithmetic units due to the execution of jobs may be suppressed without setting higher maximum allowable temperatures of arithmetic units included in a data center and/or without increasing the air-conditioning performance of the data center, like the second embodiment. This results in the suppression of the entire increases of the amount of heat generated and power consumption in the data center.

In addition, the job assigning apparatus 500 according to the third embodiment, before assigning a job to an arithmetic unit, acquires power consumptions by nonoperating units from pre-stored power consumptions of arithmetic units and selects a nonoperating unit as the submission destination of the job in the increasing order of the acquired power consumptions. This allows omission of the processing of calculating power consumptions by nonoperating units and thus may reduce the volume of processing used for selecting submission destinations of jobs.

Fourth Embodiment

According to the second embodiment, the power consumptions by all nonoperating units are calculated, and the submission destination of a job is selected in the increasing order of the calculated power consumptions. However, power consumptions by memories internally contained in nonoperating units may be calculated, and the submission destination of a job may be selected in the increasing order of the calculated power consumptions by the memories. According to a fourth embodiment of the present techniques, there will be described a job assigning apparatus that calculates the power consumptions by memories internally contained in nonoperating units and selects the submission destination of a job in the increasing order of the calculated power consumptions by the memories.

Figure 14:
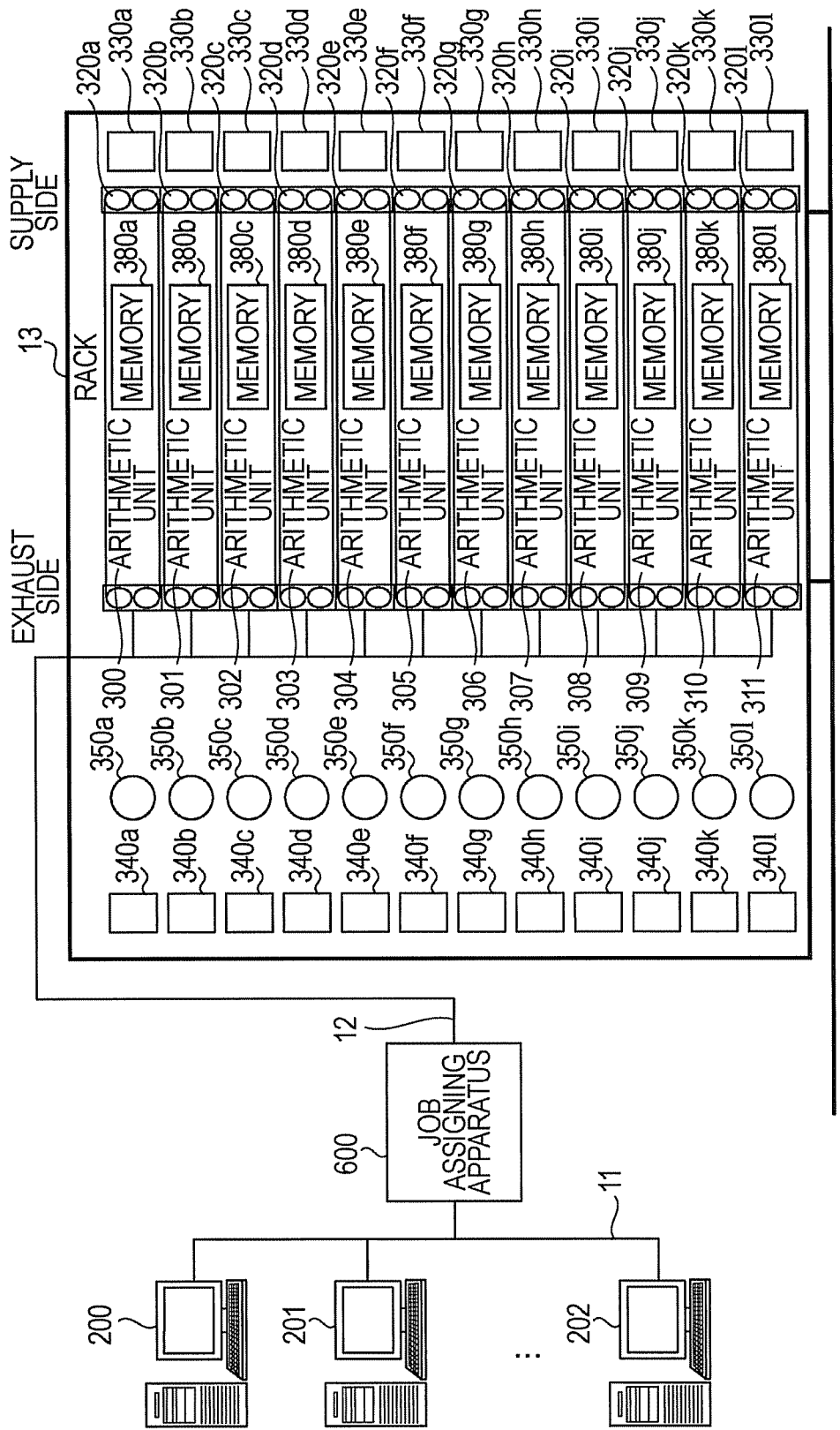
FIG. 14 illustrates a configuration of a data center according to the fourth embodiment.

First of all, there will be described a configuration of a data center where a job assigning apparatus according to the fourth embodiment will be described. FIG. 14 illustrates a configuration of a data center according to the fourth embodiment. Like numerals refer to the components having like functions to the components already described according to the second embodiment, and the detail descriptions will be omitted.

As illustrated in FIG. 14, in a data center according to this embodiment, a client apparatuses 200 to 202 and a job assigning apparatus 600 are connected over a predetermined network 11, and arithmetic units 300 to 311 and the job assigning apparatus 600 are connected over a predetermined network 12.

The air-intake sides of the arithmetic units 300 to 311 have temperature sensors 330a to 330l connected to the job assigning apparatus 100 over the network 12. The exhaust side of the arithmetic units 300 to 311 has temperature sensors 340a to 340l and air-volume sensors 350a to 350l connected to the job assigning apparatus 400 over the network 12.

Particularly in this embodiment, temperature sensors 330a to 330l and 340a to 340l and air-volume sensors 350a to 350l are provided near memories 380a to 380l internally contained in the arithmetic units 300 to 311.

The job assigning apparatus 600 assigns and submits jobs requested from the client apparatuses 200 to 202 to the arithmetic units 300 to 311. More specifically, if the job assigning apparatus 600 is instructed to submit jobs from the client apparatuses 200 to 202, the job assigning apparatus 400 first searches nonoperating units which are arithmetic units not executing jobs in a plurality of arithmetic units 300 to 311. For example, in the example illustrated in FIG. 14, the job assigning apparatus 600 searches the arithmetic units 300 to 302 which are not executing jobs as the nonoperating units.

Next, the job assigning apparatus 600 collects ambient temperatures of memories internally contained in the searched nonoperating units. In the example illustrated in FIG. 14, the job assigning apparatus 600 collects the temperatures on the air-intake and exhaust sides (or the upstream and downstream of cold air supplied by the supply and exhaust devices 320a to 320c) of the arithmetic units 300 to 302 being nonoperating units as the ambient temperatures of the memories 380a to 380c internally contained in the nonoperating units from the temperature sensors 330a to 330c and temperature sensors 340a to 340c corresponding to the arithmetic units 300 to 302.

The job assigning apparatus 600 further collects the volumes of cold air supplied from the supply and exhaust devices 320a to 320c attached to the searched nonoperating units. In the example illustrated in FIG. 14, the job assigning apparatus 600 collects the volumes of air on the exhaust side (or the downstream of cold air supplied by the supply and exhaust devices 320a to 320c) of the arithmetic units 300 to 302 being nonoperating units from the air-volume sensors 350a to 350c corresponding to the arithmetic units 300 to 302.

Next, the job assigning apparatus 600 calculates the power consumption by memories 380a to 380c internally contained in the nonoperating units on the basis of the collected ambient temperatures and volumes of air of the memories 380a to 380c. Then, the job assigning apparatus 600 selects a nonoperating unit as the submission destination of the job in the increasing order of the calculated power consumptions by the memories 380a to 380c. The job assigning apparatus 600 then submits the job to the selected submission destination.

In this way, the job assigning apparatus 600 according to the fourth embodiment calculates the power consumptions by memories internally contained in nonoperating units, and selects the submission destination of the job in the increasing order of the calculated power consumptions by the memories. Thus, memories often subject to a particularly large load for the execution of a large job such as jobs for scientific and engineering calculations are allowed to run with a minimum necessary amount of power. Therefore, the heat generated and power consumption by the memories may be suppressed. As a result, both of the entire increases of both of the heat generated and power consumption in the data center may be suppressed.

Figure 15:
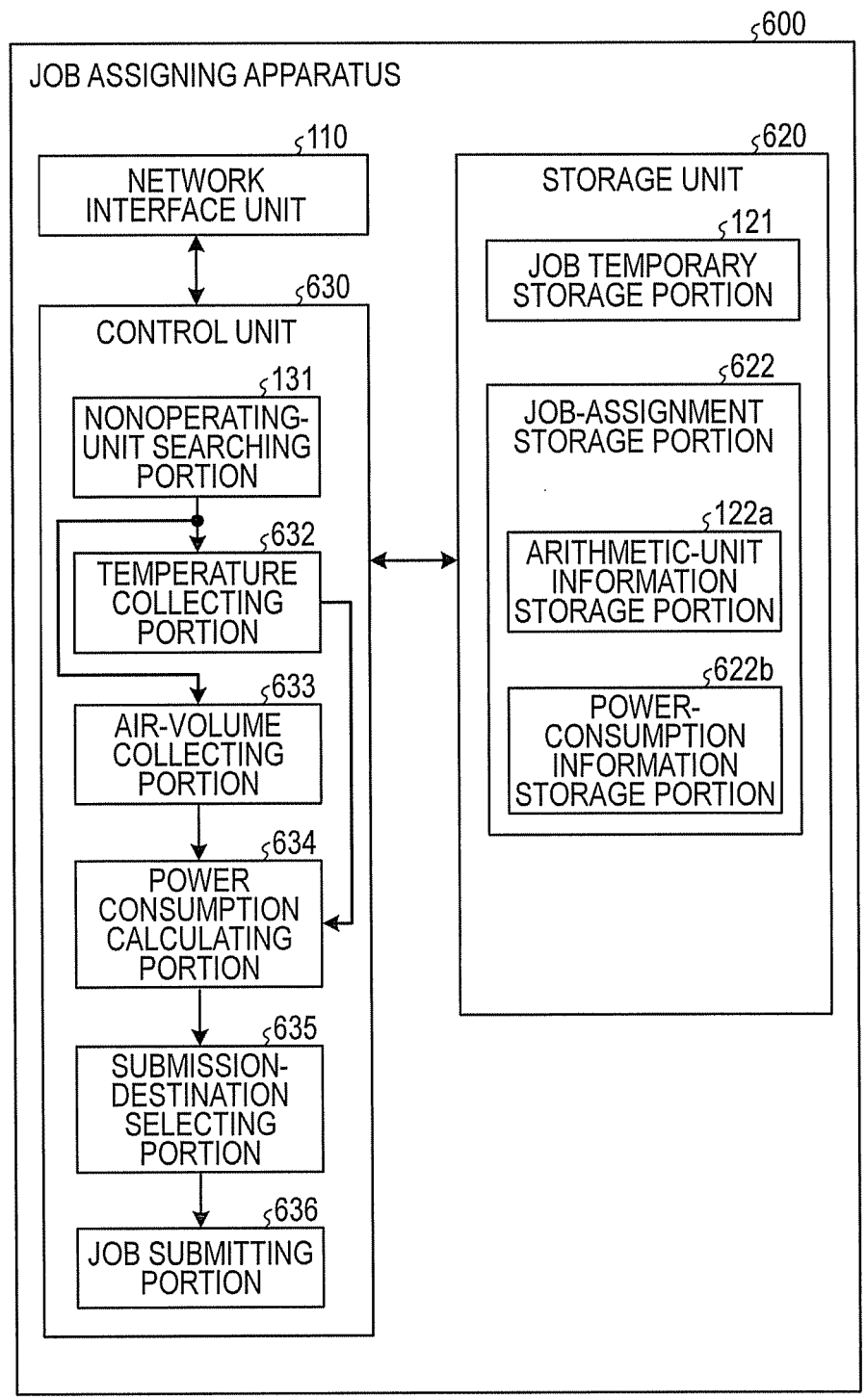
FIG. 15 is a function block diagram illustrating the job assigning apparatus in FIG. 14.

Next, the job assigning apparatus 600 illustrated in FIG. 14 will be described. FIG. 15 is a function block diagram illustrating the job assigning apparatus 600 in FIG. 14. As illustrated in FIG. 15, the job assigning apparatus 600 has a network interface unit 110, a storage unit 620, and a control unit 630.

The storage unit 520 stores data and programs used for processing by the control unit 630. The storage unit 520 has a job temporary storage portion 121 and a job-assignment storage portion 622.

The job-assignment storage portion 622 holds information used for performing processing by a submission-destination selecting portion 635, which will be described later, for example, in the control unit 630. The job-assignment storage portion 622 has an arithmetic-unit information storage portion 122a and a power-consumption information storage portion 622b.

The power-consumption information storage portion 622b stores a memory power-consumption information table having information on power consumptions of nonoperating units which are arithmetic units not executing jobs of a plurality of arithmetic units. FIG. 16 illustrates an example of the power-consumption information table stored in the memory power-consumption information storage portion 622b. As illustrated in the memory power-consumption information table 215 in FIG. 16, the power-consumption information storage portion 622b stores power-consumption information of nonoperating unit IDs and memory power consumptions. The power-consumption information is registered for each nonoperating unit.

The nonoperating unit ID is an identifier for identifying a nonoperating unit included in a plurality of arithmetic units. The memory power consumption is a power consumption by a memory internally contained in a nonoperating unit. Memory power consumptions are acquired and collected by a power-consumption calculating portion 634, which will be described later, included in the control unit 630 and are written to the table.

The control unit 630 has an internal memory for storing programs and data defining processing routines and uses them to execute various kinds of processing. Particularly, the control unit 630 has the nonoperating-unit searching portion 131, a temperature collecting portion 632, an air-volume collecting portion 633, a power-consumption calculating portion 634, a submission-destination selecting portion 635, and a job submitting portion 636.

The temperature collecting portion 632 collects ambient temperatures of the memories 380a to 380c internally contained in the searched nonoperating unit. More specifically, the temperature collecting portion 632 collects the temperatures on the air-intake and exhaust sides (or the upstream and downstream of cold air supplied by the supply and exhaust devices 320a to 320c) of the nonoperating units searched by the nonoperating unit searching portion 131 from the temperature sensors 330a to 330c and temperature sensors 340a to 340c corresponding to the arithmetic units 300 to 302 as the ambient temperatures of the memories 380a to 380c internally contained in the nonoperating units.

The air-volume collecting portion 633 further collects the volumes of cold air supplied from the supply and exhaust devices 320a to 320c attached to the searched nonoperating units. More specifically, the air-volume collecting portion 633 collects the volumes of air on the exhaust side (or the downstream of cold air supplied by the supply and exhaust devices 320a to 320c) of the nonoperating units searched by the nonoperating unit searching portion 131 from the air-volume sensors 350a to 350c corresponding to the nonoperating units.

The power-consumption calculating portion 634 calculates the power consumptions by memories internally contained in the nonoperating units on the basis of the collected ambient temperatures and volumes of air. The power consumptions for each nonoperating unit are calculated by the same method as that of the second embodiment.

The power-consumption calculating portion 634 stores the arithmetic unit ID identifying the nonoperating unit searched by the nonoperating-unit searching portion 131 as the nonoperating unit ID in the power-consumption information storage portion 622b. The power-consumption calculating portion 634 stores the memory power consumption P for each nonoperating unit calculated by Expression 1 as the memory power consumption corresponding to the nonoperating unit ID.

The submission-destination selecting portion 635 selects a nonoperating unit in the increasing order of the calculated memory power consumptions as the submission destination of the job. More specifically, the submission-destination selecting portion 635 selects a plurality of nonoperating unit IDs in the increasing order of memory power consumptions from the power-consumption information storage portion 622b and transmits the order of selection and the nonoperating unit IDs in association to the job submitting portion 636.

The job submitting portion 636 submits a job to the submission destination selected by the submission-destination selecting portion 635. More specifically, the job submitting portion 636 receives the information having association between the order of selection and the nonoperating unit IDs from the submission-destination selecting portion 635 and submits the job to the nonoperating unit identified from the nonoperating unit ID in the order of selection. In other words, the job submitting portion 636 submits jobs in the increasing order of memory power consumptions to nonoperating units.

Figure 17:
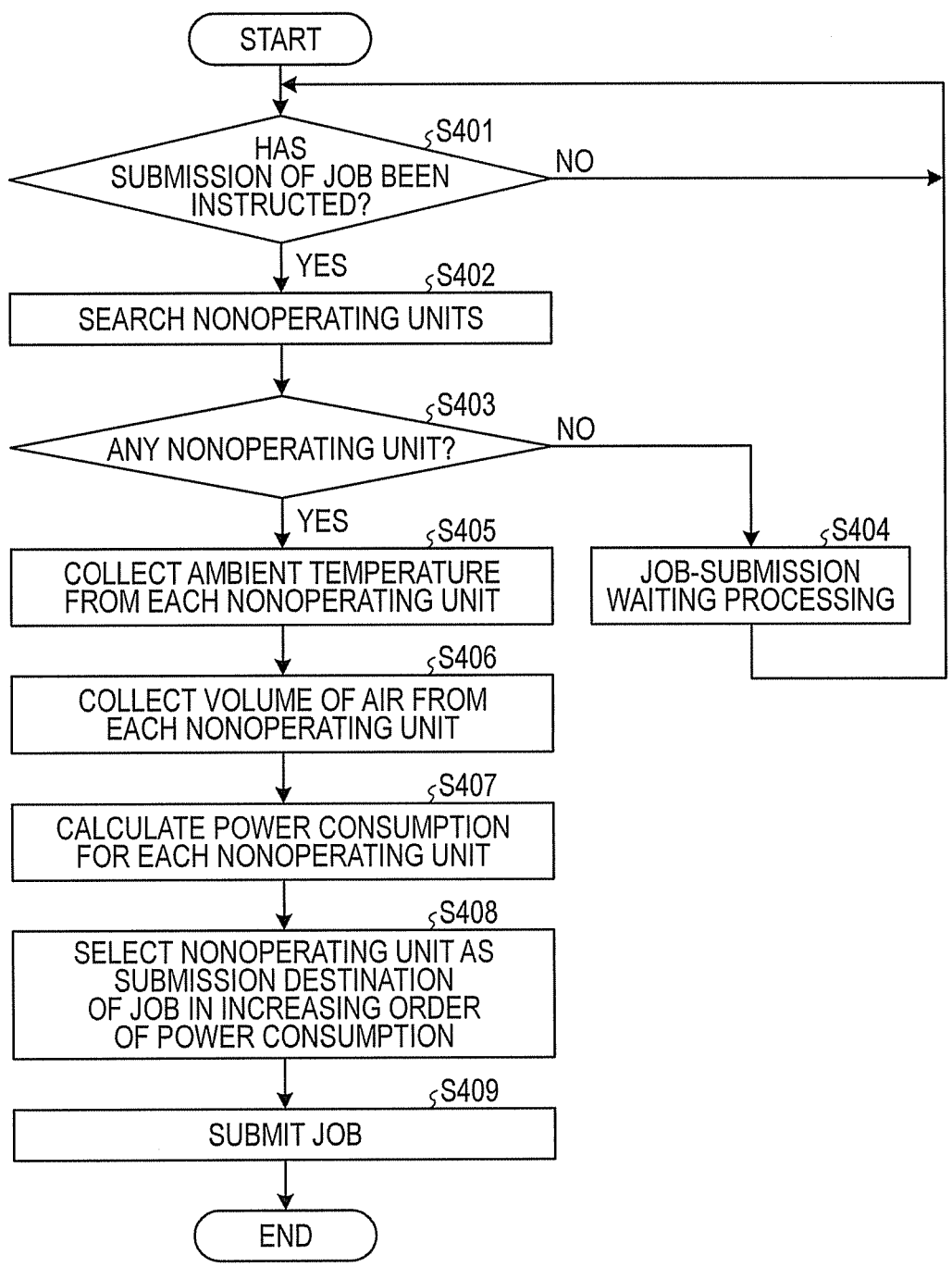
FIG. 17 is a flowchart illustrating a processing routine of job assignment processing by the job assigning apparatus according to the fourth embodiment.

Next, there will be described a processing routine of job assignment processing by the job assigning apparatus 600 according to the fourth embodiment. FIG. 17 is a flowchart illustrating a processing routine of job assignment processing by the job assigning apparatus 600 according to the fourth embodiment. The flowchart in FIG. 17 illustrates a processing routine from the retrieval by the job assigning apparatus 600 of jobs stored in the job temporary storage portion 121 to the assignment and submission of the retrieved job to one of the arithmetic units 300 to 311. The job assigning apparatus 600 repeats the processing routine. Since steps S401 to S404 illustrated in FIG. 17 correspond to steps S201 to S204 in FIG. 9, they will be described briefly.

As illustrated in FIG. 17, if the job assigning apparatus 600 receives a job submission instruction from a client apparatus and determines that some nonoperating units are present (Yes in step S401 to step S403), the nonoperating-unit searching portion 131 notifies the searched nonoperating units to the temperature collecting portion 632 and air-volume collecting portion 633.

The temperature collecting portion 632 having received the notification from the nonoperating-unit searching portion 131 collects the ambient temperatures of memories internally contained in the searched nonoperating units (step S405). The air-volume collecting portion 633 having received the notification from the nonoperating-unit searching portion 131 collects the volumes of cold air supplied from the supply and exhaust devices 320a to 320c attached to the searched nonoperating units (step S406).

On the basis of the collected ambient temperatures and volumes of air of the memories, the power-consumption calculating portion 634 calculates the power consumptions by the memories for the nonoperating units (step S407). Next, the submission-destination selecting portion 635 selects one of the nonoperating units in the increasing order of the calculated memory power consumptions as the submission destinations of the job (step S408). The job submitting portion 636 submits the job to the selected submission destination (step S409).

As described above, the job assigning apparatus 600 according to the fourth embodiment calculates the power consumptions by memories internally contained in nonoperating units and selects the submission destination of the job in the increasing order of the calculated power consumptions by the memories. Thus, memories often subject to a particularly large load for the execution of a large job such as jobs for scientific and engineering calculations are allowed to run with a minimum necessary amount of power. Therefore, the heat generated and power consumption by the memories may be suppressed. As a result, both of the entire increases of both of the heat generated and power consumption in the data center may be suppressed.

Fifth Embodiment

According to the fourth embodiment, the power consumptions by memories internally contained in nonoperating units are calculated, and the calculated memory power consumptions are used to select the submission destination of a job. However, pre-stored memory power consumptions of arithmetic units may be used to select the submission destination of a job. According to a fifth embodiment, there will be described a job assigning apparatus that uses pre-stored memory power consumptions of arithmetic units to select the submission destination of a job.

Figure 18:
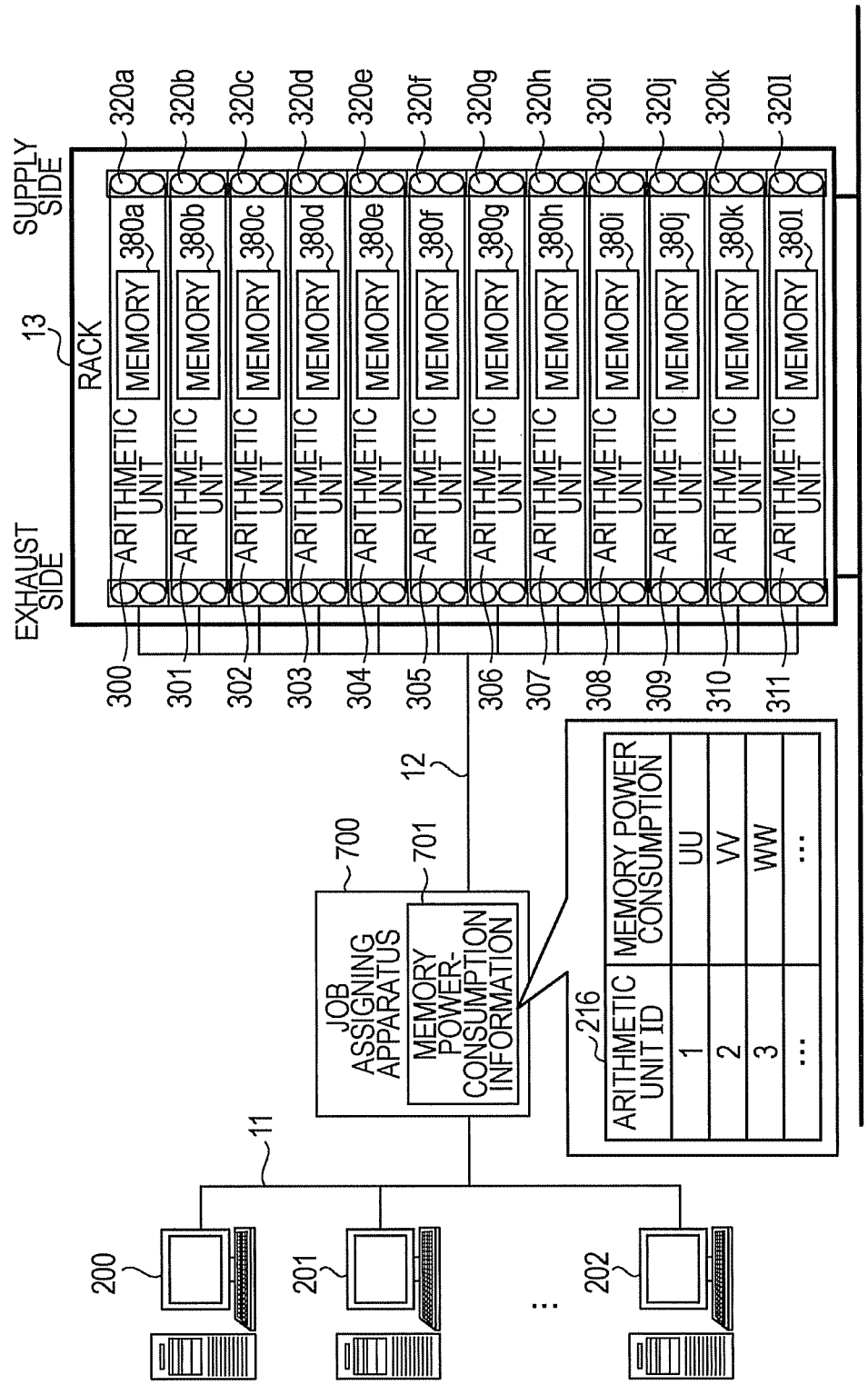
FIG. 18 illustrates a configuration of a data center according to a fifth embodiment.

First of all, there will be described a configuration of a data center where a job assigning apparatus according to a fifth embodiment will be described. FIG. 18 illustrates a configuration of a data center according to the fifth embodiment. Like numerals refer to the components having like functions to the components already described according to the first embodiment, and the detail descriptions will be omitted.

As illustrated in FIG. 18, in a data center according to this embodiment, client apparatuses 200 to 202 and a job assigning apparatus 700 are connected over a predetermined network 11, and arithmetic units 300 to 311 and the job assigning apparatus 700 are connected over a predetermined network 12.

The job assigning apparatus 700 assigns and submits jobs requested from the client apparatuses 200 to 202 to the arithmetic units 300 to 311. More specifically, if the job assigning apparatus 700 is instructed to submit jobs from the client apparatuses 200 to 202, the job assigning apparatus 700 first searches nonoperating units which are arithmetic units not executing jobs in a plurality of arithmetic units 300 to 311. For example, in the example illustrated in FIG. 18, the job assigning apparatus 700 searches the arithmetic units 300 to 302 which are not executing jobs as the nonoperating units.

Next, the job assigning apparatus 700 acquires power consumptions corresponding to the searched nonoperating units from memory power consumption information 701 which are power consumptions by the memories 380a to 380l pre-stored when jobs are submitted to the arithmetic units 300 to 311. For example, in the example illustrated in FIG. 18, the job assigning apparatus 700 acquires power consumptions by the memories 380a to 380c corresponding to the arithmetic units 300 to 302 being nonoperating units from the memory power consumption information 701.

Next, the job assigning apparatus 700 selects a nonoperating unit as the submission destination of the job in the increasing order of the acquired power consumptions, and the job is submitted to the selected submission.

In this way, the job assigning apparatus 700 according to the fifth embodiment, before assigning a job to an arithmetic unit, acquires power consumptions by the memories 380a to 380c in nonoperating units from pre-stored power consumptions by the memories 380a to 380l in arithmetic units, and selects a nonoperating unit as the submission destination of the job in the increasing order of the acquired power consumptions by the memories 380a to 380c. This allows omission of the processing of calculating power consumptions by nonoperating units and thus may reduce the volume of processing used for selecting submission destinations of jobs.

Figure 19:
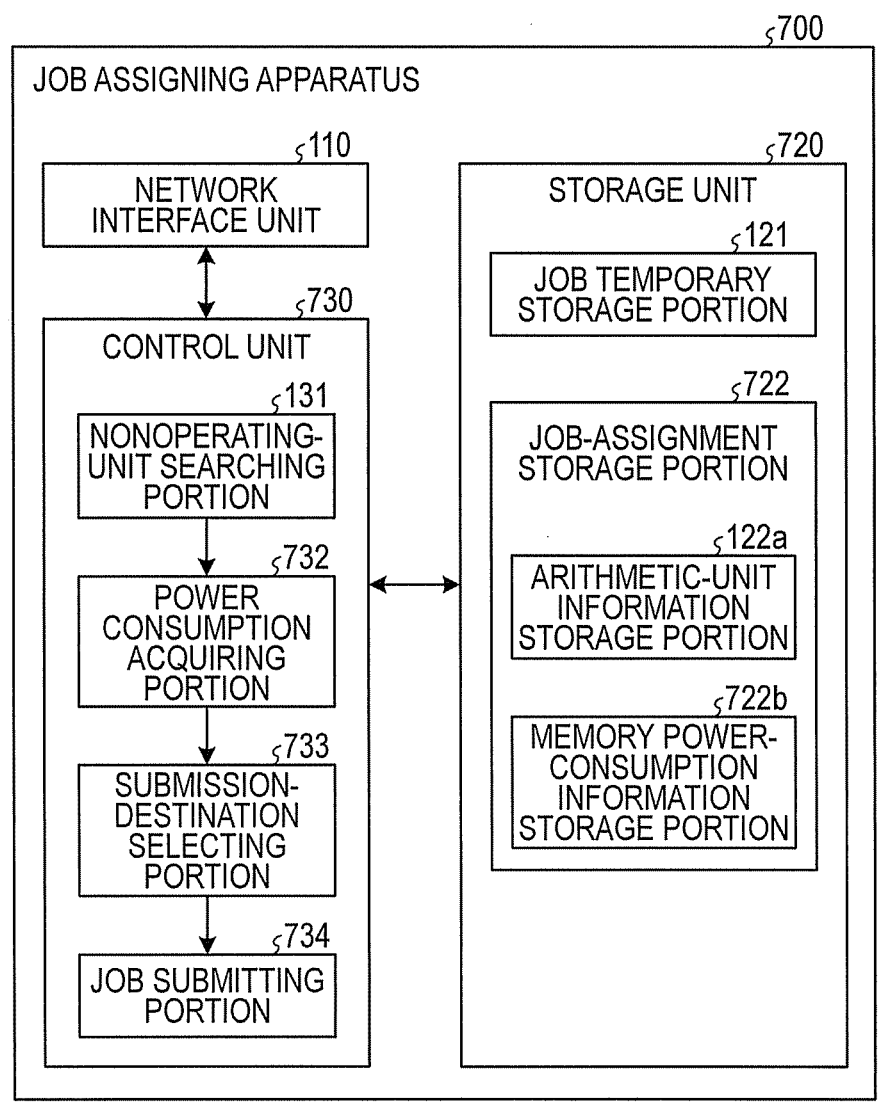
FIG. 19 is a function block diagram illustrating the job assigning apparatus in FIG. 18.

Next, the job assigning apparatus 700 illustrated in FIG. 18 will be described. FIG. 19 is a function block diagram illustrating the job assigning apparatus 700 in FIG. 18. As illustrated in FIG. 19, the job assigning apparatus 700 has a network interface unit 110, a storage unit 720, and a control unit 730.

The storage unit 720 stores data and programs used for processing by the control unit 730. The storage unit 120 has a job temporary storage portion 121 and a job-assignment storage portion 722.

The job-assignment storage portion 722 holds information used for performing processing by a submission-destination selecting portion 733, which will be described later, for example, in the control unit 730. The job-assignment storage portion 122 has an arithmetic-unit information storage portion 122a and a memory power-consumption information storage portion 722b.

The memory power-consumption information storage portion 722b stores a memory power-consumption information table having information on power consumptions by memories internally contained in arithmetic units when jobs are submitted to the arithmetic units. FIG. 20 illustrates an example of the memory power-consumption information table stored in the power-consumption information storage portion 722b. As illustrated on a memory power-consumption information table 216 in FIG. 20, the memory power-consumption information storage portion 722b stores memory power-consumption information of arithmetic unit IDs and memory power consumptions. The memory power-consumption information is stored for each arithmetic unit.

The arithmetic unit ID is an identifier for identifying an arithmetic unit. The memory power consumption is a power consumption by a memory internally contained in an arithmetic unit upon submission of a job.

The memory power consumption may be calculated and stored in advance by the following, method, for example: When the electrical resistance of one heater element included in a memory is R, the current flowing through one heater element included in the memory when a job is submitted to the arithmetic unit is i, and the coefficient depending on the capacity used for executing a job of the entire capacity of the memory is β, memory power consumption W may be expressed by:

$$W=\Sigma(\beta*R*i^2) \qquad \text{[Expression 3]}$$

Figure 21:
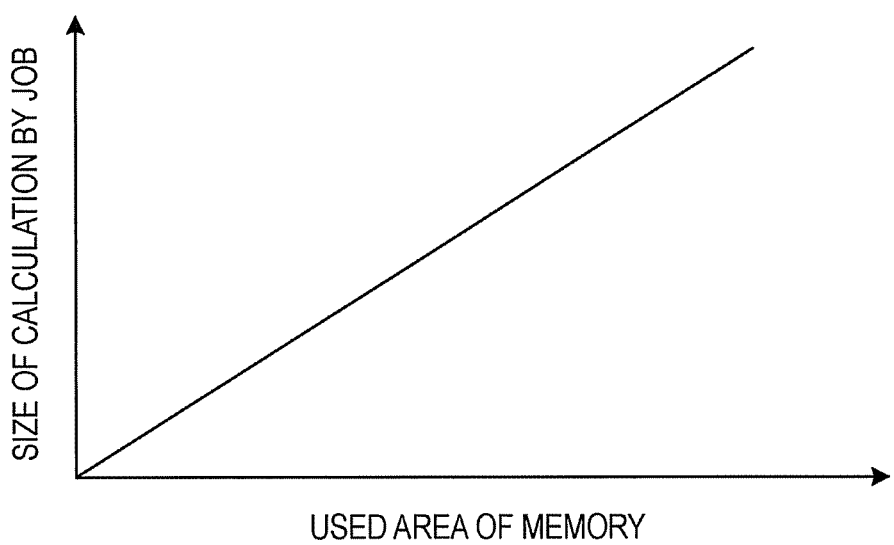
FIG. 21 illustrates an example of the relationship between the size of calculation of a job and the used area of a memory.

The coefficient β in Expression 3 is predetermined in consideration of the relationship between the size of calculation of a job and the used area of a memory. FIG. 21 illustrates an example of the relationship between the size of calculation of a job and the used area of a memory. As illustrated in FIG. 21, as the size of calculation of a job increases, the used area of a memory increases. In consideration of the relationship between the size of calculation of a job and the used area of a memory, the coefficient β is predetermined in accordance with the size of calculation of a job.

The control unit 730 has an internal memory for storing programs and data defining processing routines and uses them to execute various kinds of processing. Particularly, the control unit 730 has a nonoperating-unit searching portion 131, a power-consumption acquiring portion 732, a submission-destination selecting portion 733, and a job submitting portion 734.

The power consumption acquiring portion 732 acquires the power consumptions corresponding to nonoperating units from the memory power consumption information stored in the memory power consumption information storage unit 722b. More specifically, the power consumption acquiring portion 732 acquires the memory power consumptions corresponding to the arithmetic unit IDs indicating the nonoperating units searched by the nonoperating-unit searching portion 131 from the memory power consumption information stored in the memory power consumption information storage unit 722b.

The submission-destination selecting portion 733 selects a nonoperating unit in the increasing order of the acquired memory power consumptions as the submission destination of the job. More specifically, the submission-destination selecting portion 733 selects a plurality of arithmetic unit IDs indicating nonoperating units in the increasing order of memory power consumptions from the memory power-consumption information storage portion 722b and transmits data having association between the order of selection and the arithmetic unit IDs indicating nonoperating units to the job submitting portion 734.

The job submitting portion 734 submits a job to the submission destination selected by the submission-destination selecting portion 733. More specifically, the job submitting portion 734 receives the data having association between the order of selection and the arithmetic unit IDs indicating nonoperating units from the submission-destination selecting portion 733 and submits the job to the nonoperating unit identified from the nonoperating unit ID in the order of selection. In other words, the job submitting portion 734 submits jobs in the increasing order of memory power consumptions to nonoperating units.

Figure 22:
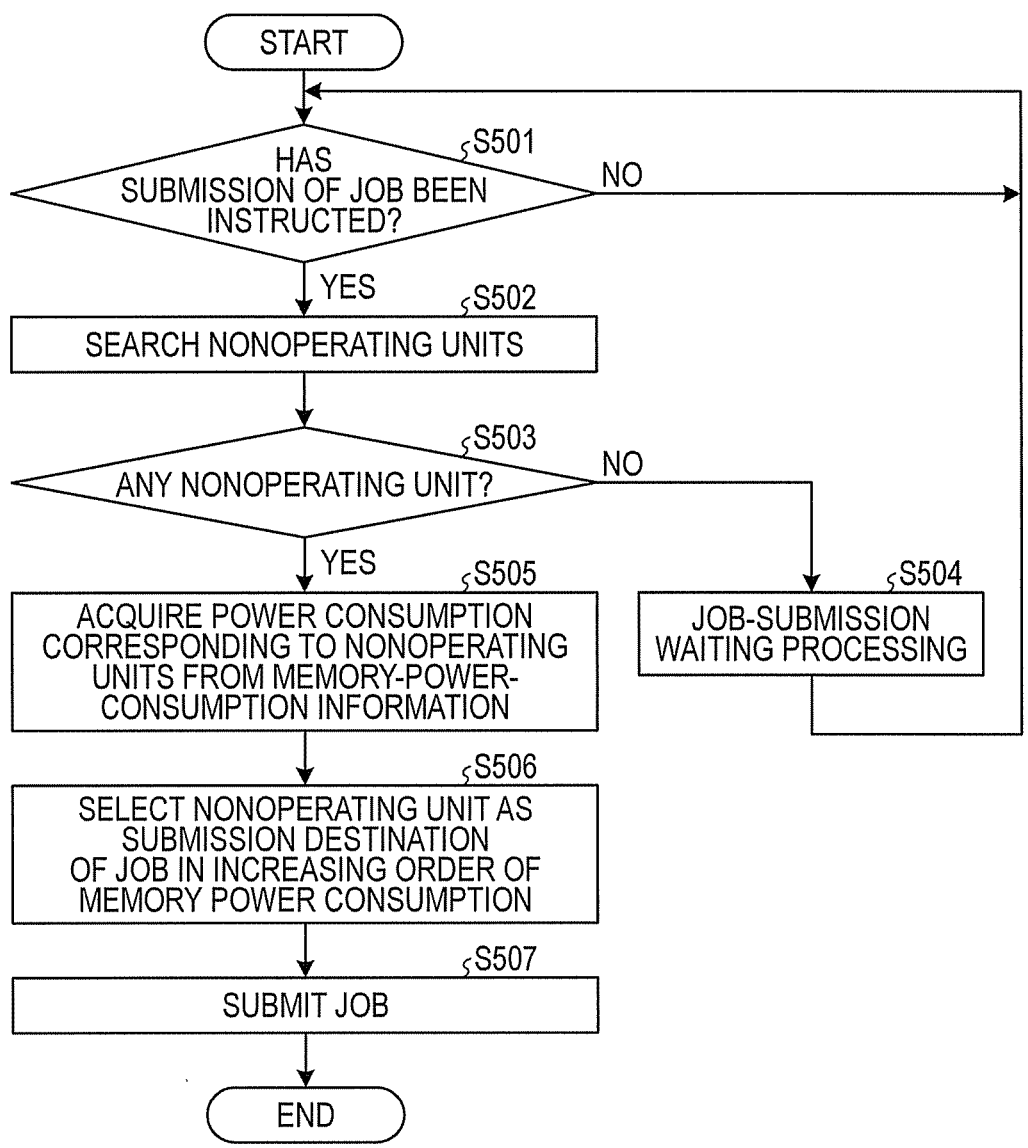
FIG. 22 is a flowchart illustrating a processing routine of job assignment processing by the job assigning apparatus according to the fifth embodiment.

Next, there will be described a processing routine of job assignment processing by the job assigning apparatus 700 according to the fifth embodiment. FIG. 22 is a flowchart illustrating a processing routine of job assignment processing by the job assigning apparatus 700 according to the fifth embodiment. The flowchart in FIG. 22 illustrates a processing routine from the retrieval by the job assigning apparatus 700 of jobs stored in the job temporary storage portion 121 to the assignment and submission of the retrieved jobs to the arithmetic units 300 to 311. The job assigning apparatus 700 repeats the processing routine. Since steps S501 to S504 illustrated in FIG. 22 correspond to steps S401 to S404 in FIG. 17, they will be described briefly.

As illustrated in FIG. 22, if the job assigning apparatus 700 receives a job submission instruction from a client apparatus and determines that some nonoperating units are present (Yes in step S501 to step S503), the nonoperating-unit searching portion 131 notifies the searched nonoperating units to the power consumption acquiring portion 732.

The power consumption acquiring portion 532 having received the notification from the nonoperating-unit searching portion 131 acquires the memory power consumptions corresponding to the nonoperating units from the memory power consumption information stored in the memory power consumption information storage unit 722b (step S505).

Next, the submission-destination selecting portion 733 selects one of the nonoperating units in the increasing order of the acquired memory power consumptions as the submission destination of the job (step S506). The job submitting portion 734 submits the job to the selected submission destination (step S507).

As described above, the job assigning apparatus 700 according to the fifth embodiment, before assigning a job to an arithmetic unit, acquires power consumptions by memories in nonoperating units from pre-stored power consumptions by memories in arithmetic units, and selects a nonoperating unit as the submission destination of the job in the increasing order of the acquired memory power consumptions. This allows omission of the processing of calculating power consumptions by nonoperating units and thus may reduce the volume of processing used for selecting submission destinations of jobs.

Other Embodiments

Having described the embodiments of the present techniques, the present techniques may be implemented in various different forms excluding the aforementioned embodiments. Other embodiments included in the present techniques will be described below.

Having described according to the embodiments that a job is submitted to a nonoperating unit, the submission destination of a job may be changed from an arithmetic unit already executing a job to a nonoperating unit. There will be described a variation example of the job assigning apparatus 500 according to the third embodiment, which changes the submission destination of a job from an arithmetic unit already executing a job (called an "operating unit" hereinafter) to a nonoperating unit.

Figure 23:
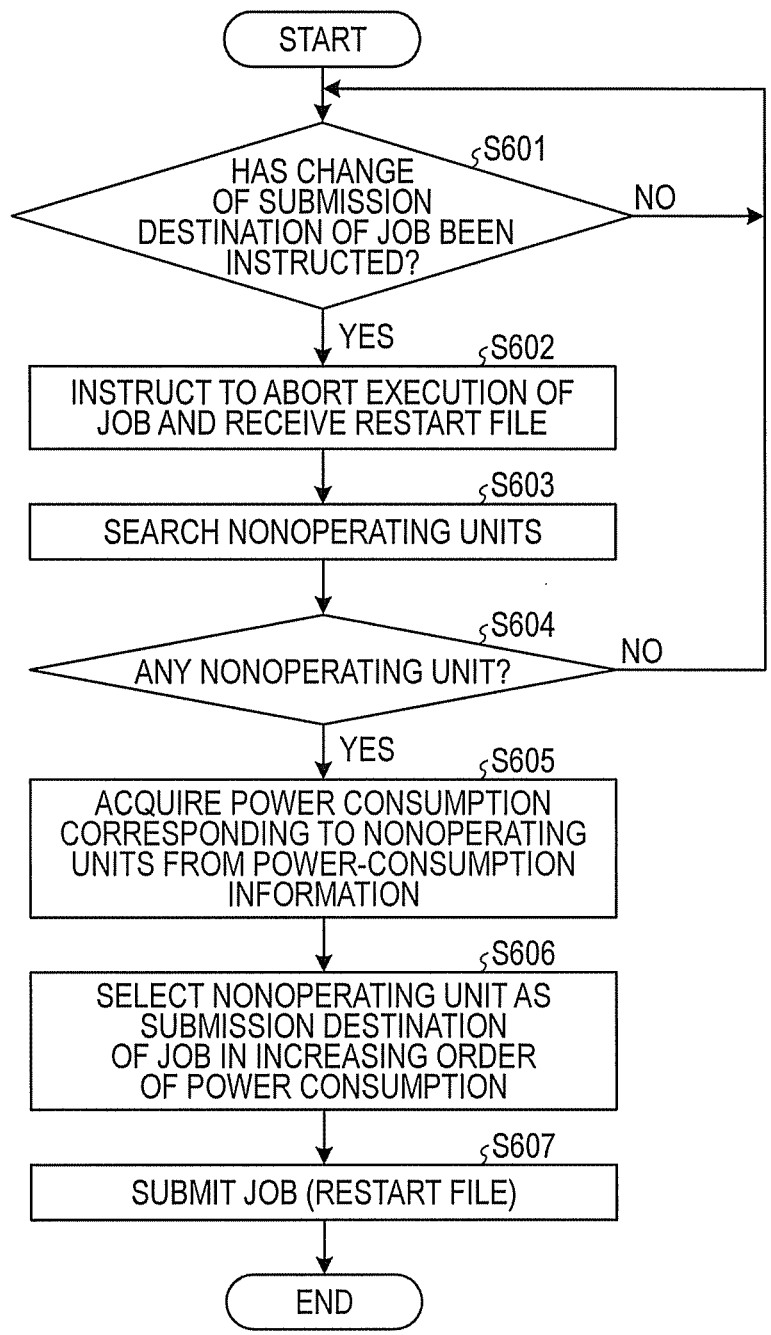
FIG. 23 is a flowchart illustrating a processing routine of processing of changing the submission destination of a job by a job assigning apparatus according to a variation example.

FIG. 23 is a flowchart illustrating a processing routine of processing of changing the submission destination of a job by a job assigning apparatus according to the variation example.

A job assigning apparatus according to the variation example first determines whether a client apparatus has instructed to change the submission destination of a job or not (step S601). If not (No in step S601) as a result of the determination, the job assigning apparatus instructs an operating unit to continue the execution of the job and waits for an instruction from a client apparatus.

If so (Yes in step S601) on the other hand, the job assigning apparatus instructs an operating unit to abort the execution of the job and receives a restart file for restarting the execution of the job from the operating unit (step S602).

Next, the nonoperating-unit searching portion 131 in the job assigning apparatus searches a nonoperating unit not executing a job in a plurality of arithmetic units 300 to 302 (step S603). The nonoperating-unit searching portion 131 then determines whether any nonoperating units are present or not (step S604).

If not (No in step S604), the nonoperating-unit searching portion 131 instructs the operating unit to continue the execution of the job and waits for an instruction from a client apparatus.

If it is determined on the other hand that some nonoperating units are present (Yes in step S604), the nonoperating-unit searching portion 131 notifies the searched nonoperating units to the power consumption acquiring portion 532.

The power consumption acquiring portion 532 having received the notification from the nonoperating-unit searching portion 131 acquires the power consumptions corresponding to the nonoperating units from the power consumption information stored in the power consumption information storage unit 522b (step S605).

Next, the submission destination selecting portion 533 selects the nonoperating units in the increasing order of the acquired power consumptions as the submission destinations of jobs (step S606). The job submitting portion 534 submits the job (that is the restart file received in step S602) to the selected submission destination (step S607).

In this way, since a job assigning apparatus according to the variation example changes the submission destination of a job from the operating unit to a nonoperating unit, more flexible job assignment is allowed. In addition, a nonoperating unit is selected as the submission destination of a job in the increasing order of power consumptions to change the submission destination of the job from the operating unit to the nonoperating unit. Thus, the same effect as that of the third embodiment may be provided.

According to the aforementioned embodiments, nonoperating units included in a plurality of arithmetic units are searched, and one job is submitted to one of the searched nonoperating units. However, a plurality of jobs may be submitted to arithmetic units without searching nonoperating units. In this case, describing the job assigning apparatus 100 according to the first embodiment, for example, the nonoperating-unit searching portion 131 may be omitted. The temperature collecting portion 132 may collect ambient temperatures of the arithmetic units. The submission-destination selecting portion 133 may select the arithmetic units in the increasing order of ambient temperatures collected by the temperature collecting portion 132 as the submission destinations of the jobs.

Figure 24:
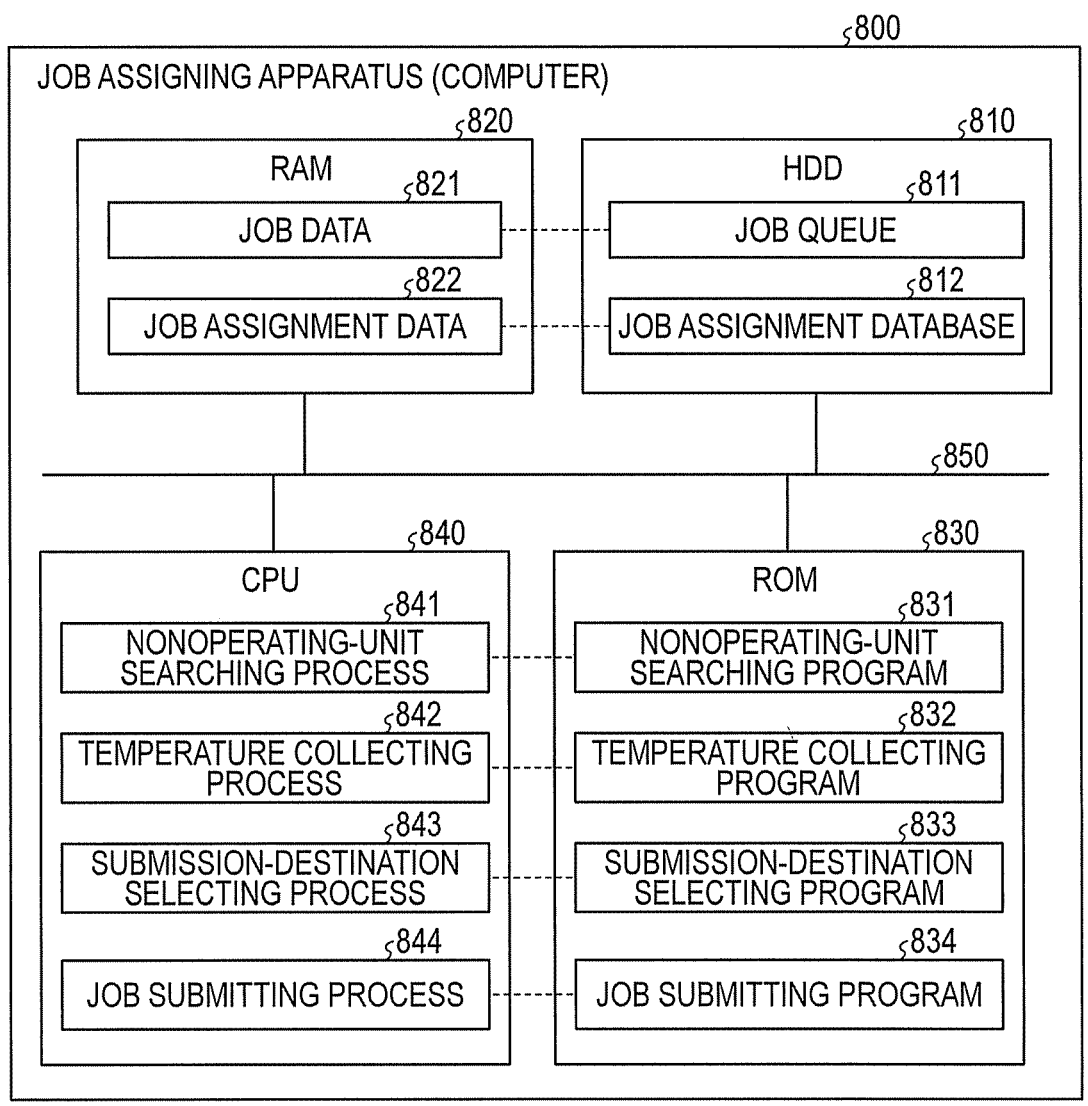
FIG. 24 illustrates a computer that executes a job assignment program according to the first embodiment.

The processing by a job assigning apparatus according to the aforementioned embodiments may be implemented by the execution of prepared programs by a computer such as a personal computer and a workstation. Hereinafter, with reference to FIG. 24, there will be described an example of a computer that executes a job assignment program having the same function as the first embodiment. FIG. 24 illustrates a computer that executes a job assignment program according to the first embodiment.

As illustrated in FIG. 24, a computer 800 being a job assigning apparatus includes a hard disk drive (HDD) 810, a random access memory (RAM) 820, a read only memory (ROM) 830 and a central processing unit (CPU) 840, which are connected via a bus 850, for example.

The ROM 830 prestores a job assignment program having the same function as the first embodiment, that is, a nonoperating-unit searching program 831, a temperature collecting program 832, a submission-destination selecting program 833 and a job submitting program 834, as illustrated in FIG. 24. The programs 831 to 834 may be distributed or integrated as used like the components of the job assigning apparatus illustrated in FIG. 2.

The CPU 840 reads and executes the programs 831 to 834 from the ROM 830 so that the programs 831 to 834 may function as a nonoperating-unit searching process 841, a temperature collecting process 842, a submission-destination selecting process 843 and a job submitting process 844 as illustrated in FIG. 24. The processes 841 to 844 correspond to the nonoperating-unit searching portion 131, temperature collecting portion 132, submission-destination selecting portion 133, and job submitting portion 134, respectively, illustrated in FIG. 2.

The HDD 810 includes a job queue 811 and a job assignment database 812, as illustrated in FIG. 24. The job queue 811 and job assignment database 812 correspond to the job temporary storage portion 121 and job-assignment storage portion 122 illustrated in FIG. 2.

The CPU 840 reads the job queue 811 and job assignment database 812, stores them to the RAM 820 and uses job data 821 and job assignment data 822 stored in the RAM 820 to execute the job assignment program.

The job assigning apparatus 100 according to this embodiment may be implemented by the execution of a prepared program by a computer such as a personal computer and a workstation. The program may be recorded in a computer-readable recording medium such as a hard disk, a flexible disk (FD), a CD-ROM, an MO, and a DVD and may be read and executed from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A job assigning apparatus connected with a plurality of arithmetic units to assign a job to each of the arithmetic units, the job assigning apparatus comprising:
   a power consumption acquiring processor to acquire power consumptions with respect to each of the arithmetic units;
   a selector to select one of the arithmetic units as a submission destination of a job in an increasing order of the power consumptions acquired by the power consumption acquiring processor; and
   a job submitting processor to submit a job to the submission destination, and
   wherein the selected arithmetic unit is determined by comparing the power consumption levels of non-operating arithmetic units, the power consumption levels determined using ambient temperature data corresponding with air volume data for each of the non-operating arithmetic units.

2. The job assigning apparatus according to claim 1, comprising:
   a temperature collector to collect ambient temperatures of each of the arithmetic units;
   an air volume collector to collect volumes of cold air supplied from supply and exhaust devices attached to each of the arithmetic units,
   wherein the power consumption acquiring processor calculates the power consumptions of each of the arithmetic units based on the ambient temperatures collected by the temperature collector and the volumes collected by the air volume collector.

3. The job assigning apparatus according to claim 1, wherein the power consumption acquiring processor acquires the power consumptions from power consumption information pre-stored to a storage portion and including the power consumptions during submission of a job to each of the arithmetic units.

4. The job assigning apparatus according to claim 2, wherein each of the supply and exhaust devices supplies cold air to the corresponding attached arithmetic unit from one end and exhausts from the other end, and the air-volume collector collects the air volumes on another end of each of the arithmetic units.

5. A job assigning apparatus connected with a plurality of arithmetic units to assign a job to each of the arithmetic units including a memory, the job assigning apparatus comprising:
   a power consumption acquiring processor to acquire memory power consumptions with respect to each memory;
   a selector to select one of the arithmetic units as a submission destination in an increasing order of the memory power consumptions acquired by the power consumption acquiring processor; and
   a job submitting processor to submit a job to the submission destination, and
   wherein the selected arithmetic unit is determined by comparing the power consumption levels of non-operating arithmetic units, the power consumption levels determined using ambient temperature data corresponding with air volume data for each of the non-operating arithmetic units.

6. The job assigning apparatus according to claim 5, comprising:
   a temperature collector to collect ambient temperatures of each memory;
   an air volume collector to collect volumes of cold air supplied from supply and exhaust devices attached to each of the arithmetic units,
   wherein the power consumption acquiring processor calculates the memory power consumptions of each memory based on the ambient temperatures collected by the temperature collector and the volumes collected by the air volume collector.

7. The job assigning apparatus according to claim 5, wherein the power consumption acquiring processor acquires the memory power consumptions from memory power consumption information pre-stored to a storage portion and including the memory power consumptions during submission of a job to each of the arithmetic units.

8. The job assigning apparatus according to claim 6, wherein each of the supply and exhaust devices supplies cold air to the corresponding attached arithmetic unit from one end and exhausts from the other end, and the air-volume collector collects the volumes of air on another end of each of the arithmetic units.

9. A job assignment method to control to a job assigning apparatus connected with a plurality of arithmetic units to assign a job to each of the arithmetic units, the job assignment method comprising:
   acquiring power consumptions with respect to each of the arithmetic units;
   selecting one of the arithmetic units as a submission destination in an increasing order of the acquired power consumptions; and
   submitting a job to the submission destination, and
   wherein the selected arithmetic unit is determined by comparing the power consumption levels of non-operating arithmetic units, the power consumption levels determined using ambient temperature data corresponding with air volume data for each of the non-operating arithmetic units.

10. The job assignment method according to claim 9, comprising:
    collecting ambient temperatures of each of the arithmetic units;
    collecting volumes of cold air supplied from supply and exhaust devices attached to each of the arithmetic units,
    wherein the acquiring includes calculating the power consumptions of each of the arithmetic units based on the collected ambient temperatures and the collected volumes.

11. The job assignment method according to claim 9, wherein the acquiring includes acquiring the power consumptions from power consumption information that is pre-stored to a storage portion and includes the power consumptions during submission of a job to each of the arithmetic units.

* * * * *